United States Patent
Kondoh

[11] Patent Number: 6,089,843
[45] Date of Patent: Jul. 18, 2000

[54] SLIDING MEMBER AND OIL PUMP

[75] Inventor: Katsuyoshi Kondoh, Itami, Japan

[73] Assignee: Sumitomo Electric Industries, Ltd., Osaka, Japan

[21] Appl. No.: 09/150,597

[22] Filed: Sep. 10, 1998

[30] Foreign Application Priority Data

Oct. 3, 1997 [JP] Japan ................................. 9-271209
Oct. 9, 1997 [JP] Japan ................................. 9-293232

[51] Int. Cl.$^7$ .................................................. F01C 21/00
[52] U.S. Cl. ......................... 418/179; 418/171; 251/368; 384/912; 384/913; 75/230; 75/249; 419/39; 419/30
[58] Field of Search ................................. 418/179, 171; 251/368; 384/912, 913; 75/230, 249; 419/39, 30

[56] References Cited

U.S. PATENT DOCUMENTS

| | | | |
|---|---|---|---|
| 5,199,971 | 4/1993 | Akechi | 75/249 |
| 5,304,343 | 4/1994 | Muira et al. | 419/39 |
| 5,338,168 | 8/1994 | Kondoh et al. | 418/179 |
| 5,368,629 | 11/1994 | Kondoh et al. | 75/249 |
| 5,387,272 | 2/1995 | Kamitsuma et al. | 75/230 |
| 5,460,775 | 10/1995 | Hayashi et al. | 419/30 |
| 5,605,558 | 2/1997 | Yamagata et al. | 75/230 |
| 5,902,943 | 5/1999 | Schaffer et al. | 75/249 |
| 6,012,703 | 1/2000 | Hayashi et al. | 251/368 |

FOREIGN PATENT DOCUMENTS

| | | |
|---|---|---|
| 0508426 | 10/1992 | European Pat. Off. . |
| 0577062 | 1/1994 | European Pat. Off. . |
| 0577436 | 1/1994 | European Pat. Off. . |
| 0704543 | 4/1996 | European Pat. Off. . |
| 57-136801 | 8/1982 | Japan . |
| 60-085284 | 5/1985 | Japan . |
| 60-128983 | 7/1985 | Japan . |
| 60-209609 | 10/1985 | Japan . |
| 01159479 | 6/1989 | Japan . |
| 02169881 | 6/1990 | Japan . |
| 02173472 | 7/1990 | Japan . |
| 03294678 | 12/1991 | Japan . |
| 04099204 | 3/1992 | Japan . |
| 04350373 | 12/1992 | Japan . |
| 05018368 | 1/1993 | Japan . |
| 05043917 | 2/1993 | Japan . |
| 05079468 | 3/1993 | Japan . |
| 5-47457 | 6/1993 | Japan . |
| 06002669 | 1/1994 | Japan . |
| 06074303 | 3/1994 | Japan . |
| 06221274 | 8/1994 | Japan . |
| 6-73386 | 10/1994 | Japan . |
| 07151065 | 6/1995 | Japan . |
| 09157137 | 6/1997 | Japan . |

*Primary Examiner*—Thomas Denion
*Assistant Examiner*—Thai-Ba Trieu
*Attorney, Agent, or Firm*—W. F. Fasse; W. G. Fasse

[57] ABSTRACT

An outer rotor and an inner rotor are formed of sintered aluminum alloy. The sintered aluminum alloy contains 0.5 wt % to 11 wt % of aluminum nitride. Porosity of the sintered aluminum alloy for outer rotor is 3 vol % to 15 vol %. Porosity of the sintered aluminum alloy for inner rotor is 2 vol % to 10 vol %. Outer rotor and inner rotor are set in a pump case. A rotary driving shaft formed of steel is inserted to a through hole of inner rotor. A press fit member is inserted at a press fit surface of inner rotor and rotary driving shaft. Accordingly, sliding members formed of sintered aluminum alloy which reduces seizure and abrasive wear of the inner and outer rotors can be provided, and in addition, an oil pump of which wear and damage at the inner rotor inner diameter surface is suppressed, can be provided.

25 Claims, 9 Drawing Sheets

SINTERED ALUMINUM ALLOY FORMED BY DIRECT NITRIDING
(TEM IMAGE)

SINTERED ALUMINUM ALLOY FORMED BY DIRECT NITRIDING
(SIM IMAGE)

SINTERED ALUMINUM ALLOY FORMED BY ADDING AlN PARTICLES
(SIM IMAGE)

SINTERED ALUMINUM ALLOY FORMED BY
DIRECT NITRIDING (TEM IMAGE)

SINTERED ALUMINUM ALLOY FORMED BY
ADDING AlN PARTICLES (SIM IMAGE)

200 μm

SINTERED ALUMINUM ALLOY (TIP SIDE)
SINTERED ALUMINUM ALLOY FORMED BY
DIRECT NITRIDING

200 μm

ADC 12 MATERIAL (DISK SIDE)
SINTERED ALUMINUM ALLOY FORMED BY
DIRECT NITRIDING

SINTERED ALUMINUM ALLOY (TIP SIDE)
SINTERED ALUMINUM ALLOY FORMED BY ADDING AlN PARTICLES

ADC 12 MATERIAL (DISK SIDE)
SINTERED ALUMINUM ALLOY FORMED BY ADDING AlN PARTICLES

INSCRIBED GEAR ROTOR SET

INSCRIBED GEAR ROTOR SET
WITH PRESS FIT MEMBER

SLIDING MEMBER AND OIL PUMP

BACKGROUND OF THE INVENTION

1. Field of the Invention

The present invention according to one aspect relates to a sliding member and, more specifically, a sliding member employing sintered aluminum alloy which can reduce seizure and adhesive wear experienced when sintered aluminum alloy members are friction-slid with each other in oil. Especially, the present invention relates to a sliding member applied to a gear rotor set including an inscribed gear used for an oil pump for engine lubricant, for automatic transmission (AT) for fuel supply, a sliding member employing sintered aluminum alloy which can reduce seizure and adhesive wear experienced when a sintered aluminum alloy member and ingot metallurgy aluminum alloy member are friction-slid, or to a friction member applied to hydraulic control valve or an oil control valve used in a hydraulic cycling path of ATF (Automatic Transmission Fluid) in Automatic Transmission (AT), Manual Transmission (MT), power steering or the like.

According to another aspect, the present invention relates to an oil pump and, more particularly, to an oil pump having a gear rotor set formed of aluminum alloy, of inscribed gear type, for engine lubricant, automatic transmission (hereinafter simply referred to as "AT") or for fuel supply.

2. Description of the Background Art

As a first prior art example, a gear rotor set used in an oil pump for engine lubricant, AT or fuel supply will be described. The gear rotor set includes an outer rotor and an inner rotor set in the outer rotor. The gear rotor set is set in a pump case. Teeth based on any of trochoid curve, involute curve and hypo-cycloid curve is formed on an inner side of the outer rotor and on an outer side of the inner rotor.

Conventionally, the pump case has been formed of cast iron, while the gear rotor set in the pump case has been formed of iron based sintered body. Recently, in view of weight reduction, application of aluminum alloy has been studied. In the pump, lubricant oil at a temperature of 150° C. or higher circulates, and therefore the temperature of the pump as a whole increases. At this time, if coefficient of thermal expansion of the material of the pump case is much different from the coefficient of thermal expansion of the material of the gear rotor set, clearance therebetween increases, reducing volume efficiency of the pump. Accordingly, when aluminum alloy is applied to the pump case, it is necessary to apply aluminum alloy to the gear rotor set as well, so that the pump case and the gear rotor set come to have coefficients of thermal expansion close to each other.

Japanese Patent Laying-Open Nos. 60-128983, 2-169881 and 4-99204 disclose a gear rotor set to which sintered aluminum alloy is applied, as well as manufacturing method thereof.

As a second prior art example, an oil pressure-flow rate control valve formed of aluminum alloy used in an oil pump for AT, MT or power steering will be described. The valve includes a valve case, and a valve spool arranged in the valve case. The valve spool has a substantially columner shape, with a groove formed in circumferential direction thereof. The valve spool reciprocates and slides in axial direction of the valve spool, with a lubricant oil interposed with the valve case. This reciprocating sliding controls oil pressure and flow rate of oil.

Conventionally, the valve spool has been formed of iron based sintered material or steel product, while the valve case has been formed of cast iron. Recently, in view of weight reduction, aluminum alloy has come to be applied to the valve spool and the valve case. However, different from the valve spool and the valve case formed of iron based material, the valve spool and the valve case formed of aluminum alloy are more susceptible to the problems of abrasive wear, seizure and sticking caused by friction sliding of aluminum alloy members with each other.

In order to solve such problems, Japanese Patent Laying-Open Nos. 60-209609 and 2-173472 proposed anodizing plating, Tuframe process or hard coating such as Ni—P plating of a sliding surface of the valve spool and valve case, or the surface of aluminum alloy used therefor.

The anodizing plating refers to a process of forming a film by anodic oxidation of aluminum. Tuframe process refers to impregnation of polytetrafluoroethylene (trade name Teflon) in addition to anodizing plating. Ni—P plating is implemented by plating the surface of aluminum alloy with N—P plating liquid.

However, the gear rotor set for the oil pump in accordance with the first prior art example suffers from the following problem.

Japanese Patent Laying-Open No. 60-128983 proposes a method of forming the inner and outer rotors using sintered aluminum alloy. Here, the sintered aluminum alloy refers to an alloy prepared by press compacting aluminum alloy powder having a prescribed composition, and heating and sintering the same. Further, it also refers to the sintered aluminum alloy subjected to recompression of sizing or coining. Accordingly, it is distinguished from aluminum alloy of which relative density is made as close as possible to 100% by plastic deformation such as hot forging or hot extrusion.

The gear rotor set formed of such sintered aluminum alloy may be applicable to a pump to which a relatively low torque is applied, such as an engine lubricant pump. In case of an AT oil pump, however, the inner rotor is rotated by a driving shaft and, at that time, a high stress from the shaft is exerted on the inner diameter portion of the inner rotor which is in contact with the shaft. Therefore, high strength and high hardness are required of the inner rotor to reduce wear and damage. Especially, the outer rotor is prone to seizure and wear with a mating material at an outer peripheral surface which slides over the pump case and at the tip of the teeth sliding over the inner rotor. Therefore, superior seizure resistance is required of the outer rotor.

Accordingly, it is difficult to apply sintered aluminum alloy having low strength to the inner rotor to which high torque is applied or to the outer rotor of which superior seizure resistance is required.

The aluminum alloy powder prepared by hot forging or hot extrusion has high strength. Therefore, the aluminum alloy powder can well be applied to the gear rotor set of AT oil pump described above in view of mechanical strength. Japanese Patent Laying-Open Nos. 2-169881 and 4-99204 propose manufacturing method thereof.

It is very difficult, however, to form the inner rotor or the outer rotor having sufficiently high dimensional precision using the sintered aluminum alloy fabricated by hot forging or hot extrusion. Therefore, the teeth of the inner rotor and the outer rotor must be all formed by machining including cutting, grinding, end mill, electrical discharge machining and polishing. Such process increases manufacturing cost of the inner rotor and the outer rotor, presenting economical problem.

In view of the problems described above, the inventors of the present invention proposed, in Japanese Patent Application No. 9-157137 entitled "Gear Rotor Set Formed of Powder Aluminum Alloy and Manufacturing Method Thereof", a gear rotor set formed of an aluminum alloy in which sintered aluminum alloy having appropriate porosity is applied to the outer rotor which requires superior seizure resistance, so that the seizure resistance is improved by the oil retaining effect of the pores.

For the inner rotor which requires high hardness and stiffness, powder forged aluminum alloy having high strength prepared by hot forging or hot extrusion is used, and therefore the problem of seizure or sticking can be prevented.

In any approach, however, the inner rotor is set in the pump case, and fit in and rotated by the rotary driving shaft formed of steel. In order to facilitate insertion of the driving shaft through the inner rotor, there is provided a clearance between the inner surface of the inner rotor and the contact surface of the driving shaft. When the driving shaft rotates, the inner surface of the inner rotor is hit by the driving shaft as there is a clearance. Consequently, the inner circumferential surface of the inner rotor is wore and damaged, or suffers from laminer peeling at the surface portion, caused by bearing fatigue resulting from difference in mechanical characteristics including strength, hardness and stiffness between the steel and the aluminum alloy.

The valve in accordance with the second prior art example suffers from the following problem. In the valve spool and the valve case to which aluminum alloy coated with hard coating is applied, the cost is higher as compared with the conventional ones formed of iron based material, causing economical problem. Further, peeling and friction of hard coating are observed when the valve spool slides.

A valve having a combination of a valve spool formed of aluminum alloy subjected to anodizing plating and a valve case formed of iron based alloy, or a valve having the combination of a valve spool formed of an iron based alloy and the valve case formed of an aluminum alloy subjected to anodizing plating suffers from the following problem, because of the difference in coefficient of thermal expansion between the valve spool and the valve case.

More specifically, when the temperature is low, clearance between the valve spool and the valve case is small, causing sticking where the valve spool cannot slide satisfactory. When the temperature is as high as about 150 to about 180° C., the clearance is larger than an appropriate value, so that oil pressure is decreased, or flow rate of oil increases or fluctuates, degrading performance of the oil pump.

In order to solve such a problem, it is effective to make coefficients of thermal expansion of the valve spool and the valve case as close to each other as possible. For this purpose also, it is preferred to apply aluminum alloy both to the valve spool and the valve case. Japanese Patent Laying-Open No. 2-173472 proposes a method of ensuring high performance by defining difference in coefficients of thermal expansion of the valve spool and the valve case.

In this case, however, in order to avoid sticking and friction between the valve spool and the valve case formed of aluminum alloy, both are subjected to anodizing plating or resin impregnated Ni—P plating. Such process increases cost, while lowering reliability.

SUMMARY OF THE INVENTION

The present invention was made to solve the above described problems, and an object is to provide a sliding member having superior machinability, while reducing wear and damage, seizure and sticking.

Another object of the present invention is to provide an oil pump in which wear and damage as well as laminer peeling of the inner peripheral surface of the inner rotor can be prevented.

The sliding member in accordance with one aspect of the present invention includes a pair of sliding members sliding with each other. One sliding member is formed of an aluminum alloy containing 5 to 30% by weight (wt %) of silicon. The other sliding member is formed of a sintered aluminum alloy containing 0.1 wt % to 3.5 wt % of nitrogen. The nitrogen exists in the form of aluminum nitride, in the sintered aluminum alloy.

Thus, sliding members having superior wear resistance, heat resistance, seizure resistance and machinability are provided. If the amount of nitrogen is smaller than 0.1 wt % or the amount of silicon is smaller than 5 wt %, however, sufficient heat resistance or wear resistance cannot be ensured. If the amount of nitrogen exceeds 3.5 wt % or the amount of silicon exceeds 30 wt %, wear resistance and the like are not much improved, while machinability and toughness are degraded, or the time for the sintering process takes longer, which is disadvantageous in view of economy.

Preferably, the aluminum alloy for the aforementioned one sliding member is sintered aluminum alloy.

In that case, wear resistance and heat resistance of the sliding member can further be improved.

More preferably, the aluminum alloy for the aforementioned one sliding member is an ingot metallurgy aluminum alloy containing 5 wt % to 20 wt % of silicon.

In this case, the sliding member can be formed at a relatively low cost. If the amount of silicon is smaller than 5 wt %, sufficient wear resistance, seizure resistance and the like of the sliding member cannot be ensured. If the amount of silicon in the aluminum silicon alloy fabricated by ingot metallurgy exceeds 20 wt %, coarse silicon crystal exceeding 200 µm is generated. This lowers toughness of the ingot aluminum alloy, while hardness and stiffness of the ingot aluminum alloy would be too high. Accordingly, processing of the ingot aluminum alloy would be difficult.

More preferably, the sintered aluminum alloy for the other sliding member contains 0.5 wt % to 11 wt % of aluminum nitride.

In this case, wear resistance, heat resistance, seizure resistance and machinability of the sintered aluminum alloy can further be improved. If the amount of aluminum nitride is smaller than 0.5 wt %, however, sufficient heat resistance and wear resistance cannot be ensured. If the amount of aluminum nitride exceeds 11 wt %, wear resistance is not much improved, while machinability and toughness of the sintered aluminum alloy are degraded.

Preferably, the sintered aluminum alloy for the aforementioned the other sliding member contains at least 0.05 wt % of magnesium.

Magnesium has a function of promoting direct nitriding reaction to generate and disperse aluminum nitride in the sintered aluminum alloy. More specifically, magnesium removes, by reduction, an aluminum oxide film formed on a surface of aluminum powder when the powder is heated and sintered. If the amount of magnesium is smaller than 0.05 wt %, however, reduction by magnesium is not sufficient to uniformly generate aluminum nitride in the sintered aluminum alloy.

Preferably, aluminum nitride grows in fiber structure, in one direction. In this case, sliding member having superior sliding characteristic can be obtained.

Preferably, porosity of the sintered aluminum alloy for the aforementioned the other sliding member is at most 25% by volume (vol %).

In this case, by the pores dispersed on the sliding surface of the sintered aluminum alloy, concave pits are formed on the sliding surface. The lubricant oil is held in the pits, whereby local loss of the oil film on the sliding interface can be prevented, that is, the oil film can be kept entirely over the sliding surface. As a result, wear resistance and seizure resistance can be improved. If the porosity is higher than 25 vol %, mechanical strength of the sintered aluminum alloy is degraded.

Preferably, the sintered aluminum alloy for the aforementioned the other sliding member contains at least one element selected from the group consisting of silicon, iron, nickel, chromium, titanium, manganese and zirconium, with its content being at most 25 wt %.

In this case, mechanical characteristics such as wear resistance, seizure resistance, strength, hardness and so on of the sintered aluminum alloy can be improved. If the content exceeds 25 wt %, however, these characteristics are not much improved, while toughness of the sintered aluminum alloy decreases and hardness and stiffness of the sintered aluminum alloy attain too high, making processing of the sintered aluminum alloy difficult.

Preferably, the sintered aluminum alloy for the aforementioned the other sliding member contains at least one oxide selected from the group consisting of titanium oxide, zirconium oxide, silicon oxide, magnesium oxide, aluminum oxide and chromium oxide, with its content being at most 5 wt %.

In this case, oxide particles are dispersed in the sintered aluminum alloy, improving wear resistance and seizure resistance. If the content exceeds 5 wt %, however, wear resistance and seizure resistance of the sliding member are not much improved, while machinability of the sintered aluminum alloy is degraded and the sintered aluminum alloy may possibly attack the mating material.

Preferably, the sintered aluminum alloy for the aforementioned the other sliding member contains one lubricating component selected from the group consisting of graphite, molybdenum sulfide, tungsten sulfide and calcium fluoride, with its content being at most 5 wt %.

In this case, the lubricating component reduces friction at the sliding interface and forms concave oil pits on the surface of the sliding surface, preventing loss of the oil film. As a result, seizure resistance and wear resistance of the sliding member can significantly be improved. If content of the lubricating component exceeds 5 wt %, however, bonding strength of aluminum alloy powder particles with each other as the base of the sintered aluminum alloy degrades, and therefore sufficient mechanical strength of the sliding member cannot be ensured.

Preferably, one sliding member formed of the sintered aluminum alloy is an outer rotor having on its inner peripheral portion teeth having a shape based on one curve selected from the group consisting of trochoid curve, involute curve and hypo-cycloid curve, the other sliding member formed of the sintered aluminum alloy is an inner rotor having on its outer peripheral portion teeth having a shape based on one curve selected from the group consisting of trochoid curve, involute curve and hypo-cycloid curve, with the shape of the outer rotor teeth matching the shape of the inner rotor teeth.

In the sliding member, the inner rotor is rotatably driven in the outer rotor, whereby pressure and flow rate of oil can optimally be controlled.

Preferably, porosity of the outer rotor is 3 to 15 vol %, while porosity of the inner rotor is 2 to 10 vol %.

Here, by the pores dispersed on the sliding surfaces of the outer and inner rotors, concave pits are formed on the sliding surfaces. As the lubricant is held at those portions, loss of oil film on the sliding interface can be prevented. As a result, wear resistance and seizure resistance of the inner and outer rotors can be improved. If the porosity of the outer rotor is smaller than 3 vol % or if the porosity of the inner rotor is smaller than 2 vol %, however, there would not be sufficient pores on the sliding surfaces to effectively prevent loss of oil film at the sliding interface. If the porosity of the outer rotor exceeds 15 vol % or if the porosity of the inner rotor exceeds 10 vol %, mechanical strength of the outer or inner rotor would be degraded.

Preferably, one sliding member formed of ingot metallurgy aluminum is a valve case, and the other sliding member formed of the sintered aluminum alloy is a valve spool reciprocating and sliding in the valve case.

In the sliding member, the valve spool reciprocates and slides in the axial direction within the valve case, whereby pressure and flow rate of oil can optimally be controlled.

Preferably, the sintered aluminum alloy contains 0.5 to 6 wt % of aluminum nitride.

Here, wear resistance, heat resistance, seizure resistance and machinability of the valve spool are improved. If the amount of aluminum nitride is smaller than 0.5 wt %, however, sufficient heat resistance and wear resistance are not provided. If the amount of aluminum nitride exceeds 6 wt %, wear resistance and so on are not much improved, while machinability and toughness of the valve spool are degraded.

More preferably, the coefficient of thermal expansion $\alpha_v$ of the sintered aluminum alloy and coefficient of thermal expansion $\alpha_c$ of the ingot metallurgy aluminum alloy satisfy the relation of $$-3 \times 10^{-6}/°C. \leq (\alpha_c - \alpha_v) \leq 3 \times 10^{-6}/°C.$$

Thereafter, variation in clearance between the valve spool and the valve case is reduced, and hence lowering of oil pressure and variation in oil flow rate can be suppressed. If the value $(\alpha_c - \alpha_v)$ is larger than $3 \times 10^{-6}/°C.$, increase in clearance would be larger than the optimal value because of the temperature of the oil increases, possibly resulting in lower oil pressure, increased oil flow rate or variation of the oil flow rate. If the value $(\alpha_c - \alpha_v)$ is smaller than $-3 \times 10^{-6}/°C.$, the diameter of the valve spool is significantly increased, when the temperature of oil exceeds 120° C. As a result, the valve spool comes to be in contact with the valve case, possibly increasing the oil pressure to be higher than the optimal value, or lowering of the oil flow rate.

Preferably, a hard coating having the hardness of at least 150 micro-Vickers hardness is formed on the sliding surface of the valve case.

Here, sticking can be suppressed when foreign particles should enter between the valve spool and the valve case. If the hardness of the hard coating is lower than 150 micro-Vickers hardness, the hard coating would be worn, resulting in considerable sticking, when foreign particles enter.

Sliding member in accordance with the present invention will be described in greater detail in the following.

(1) Feature and Function-Effect of Aluminum Nitride

In the sintered aluminum alloy used for the gear rotor set or the valve spool as the sliding member, aluminum nitride is generated and dispersed in the aluminum alloy in order to improve heat resistance, wear resistance, seizure resistance and to provide appropriate attacking characteristic against the mating material. Aluminum nitride is thermally stable even at a high temperature of 500° C. or higher.

In the sintered aluminum alloy prepared by the conventional powder metallurgy (hereinafter simply referred to as "conventional sintered aluminum alloy"), powder (particles) of aluminum nitride and powder of aluminum alloy are mixed, so that aluminum nitride exist added to the sintered aluminum alloy. In the sintered aluminum alloy of the present invention, aluminum component in the aluminum alloy powder is reacted with nitrogen gas, so that aluminum nitride is generated and dispersed in the aluminum alloy.

In the conventional sintered aluminum alloy, as shown in FIG. 7 which will be described with reference to the embodiments, there is a gap at the contact interface between the added aluminum nitride particles and the base of the aluminum alloy. As the particles of the aluminum alloy are constrained mechanically in aluminum alloy, the effect of improving heat resistance is limited. Further, particles of aluminum nitride fall out by friction and sliding with the mating valve case, and the fallen particles serve as hard abrasive powder, causing seizure and gaulling.

By contrast, in the sintered aluminum alloy applied to the sliding member in accordance with the present invention, aluminum nitride is generated by the reaction of aluminum in aluminum alloy powder with nitrogen gas (hereinafter referred to as "direct nitriding reaction"). Therefore, as shown in FIG. 6 which will be described with reference to the embodiments, aluminum nitride is bound to the aluminum alloy base, there is not a gap at the contact interface, and particles of aluminum nitride are tightly fixed on the base of the aluminum alloy. As a result, heat resistance, wear resistance and seizure resistance of sintered aluminum alloy can significantly be improved.

The inventors have found, in addition to these characteristics, that stiffness of the sintered aluminum alloy as a whole can significantly be improved, by the structure in which aluminum nitride particles are bonded to the aluminum alloy base. Further, the inventors have found that the sintered aluminum alloy is applicable to the inner rotor of a gear rotor set for an oil pump of which high stiffness and high hardness are required.

The gear rotor set of the oil pump is implemented by the combination of inner and outer rotors. More specifically, teeth having shapes based on any of trochoid curve, involute curve and hypo-cycloid curve are formed on the inner peripheral portion of the outer rotor and on the outer peripheral portion of the inner rotor, and an inscribed type gear rotor set having the teeth of the inner rotor match with the teeth of the outer rotor, is set in a case formed of an ingot metallurgy aluminum alloy.

Sizing or coining of the teeth portion of the inner rotor is possible without machining. As a result, the gear rotor set can be formed at a low cost. It goes without saying that the sintered aluminum alloy of the present invention is applicable to the outer rotor of which required strength and stiffness are lower than those of the inner rotor.

According to the method of manufacturing a gear rotor set in accordance with the present invention, first, aluminum alloy powder is subjected to press compaction by hydraulic press, mechanical press or cold isostatic press, so as to form a green compact. The green compact is heated and sintered in nitrogen gas atmosphere and, at a prior particle boundary of the resulting aluminum alloy sintered body, aluminum nitride is generated and dispersed by direct nitriding reaction. Dimension sizing process in metal mold by sizing, coining or the like is performed as needed, and thus gear rotor set having high dimensional precision is obtained.

A sintered aluminum alloy obtained through the above described method contains nitrogen. The nitrogen exists in the form of aluminum nitride, as described above. In the sintered aluminum alloy obtained by direct nitriding reaction, content of nitrogen in the aluminum alloy is approximately in proportion to the content of aluminum nitride. In order to attain the prescribed hardness, stiffness and wear resistance necessary for the gear rotor set, nitrogen is necessary by 0.1 wt % to 3.5 wt % with respect to the total weight of sintered aluminum alloy. This value corresponds to 0.5 wt % to 11 wt % of aluminum nitride with respect to the total weight of the sintered aluminum alloy.

When the amount of nitrogen is smaller than 0.1 wt %, that is, if the amount of aluminum nitride is smaller than 0.5 wt %, heat resistance and wear resistance of the sintered aluminum alloy are not sufficient. If the amount of nitrogen exist 3.5 wt %, that is, if the amount of aluminum nitride exceeds 11 wt %, wear resistance of sintered aluminum alloy is not much improved, while machinability and toughness decrease, and the time for the sintering process of the sintered aluminum alloy becomes longer, which is disadvantageous in view of economy.

The sintered aluminum alloy may be applied to a valve spool for controlling pressure and flow rate of oil, which is required of wear resistance and seizure resistance. According to the method of manufacturing the valve spool, first, aluminum alloy powder is subjected to press compaction by hydraulic press, cold isostatic press or the like, so as to form a green compact. The green compact is heated and sintered in a nitrogen gas atmosphere, and at the prior particle boundary of the resulting aluminum alloy sintered body, aluminum nitride is generated and dispersed by direct nitriding reaction. By performing hot extrusion or hot forging as needed, strength of the aluminum alloy sintered body is improved.

In the sintered aluminum alloy prepared through the above described method, the appropriate amount of aluminum nitride to be generated is 0.5 to 6 wt % with respect to the total weight of the sintered aluminum alloy. In view of wear resistance and machinability, more preferable amount of aluminum nitride is 1 to 4 wt %. If the amount of aluminum nitride is smaller than 0.5 wt %, heat resistance and wear resistance of the sintered aluminum alloy are not sufficient. If the amount of aluminum nitride exceeds 6 wt %, wear resistance of the sintered aluminum alloy used as the valve spool is not much improved, while machinability and toughness decreased, or the time for the sintering process of the sintered aluminum alloy becomes longer, which is disadvantageous in view of economy.

In order to generate aluminum nitride of optimal amount, sintered aluminum alloy should contain 0.1 wt % to 2 wt % of nitrogen. The inventors have found that in the sintered aluminum alloy formed by direct nitriding reaction, if the amount of nitrogen contained is smaller than 0.1 wt %, aluminum nitride of more than 0.5 wt % cannot be generated, and that if the amount of nitrogen exceeds 2 wt %, aluminum nitride exceeding 6 wt % is generated.

In order to generate and disperse aluminum nitride in the sintered aluminum alloy by direct nitriding reaction, it is necessary that 0.05 wt % or more of magnesium is contained. Magnesium is added in advance in the aluminum alloy powder. Magnesium has a function of removing, by reduction, an aluminum oxide film which covers the powder surface when the aluminum green compact is heated and sintered in nitrogen gas atmosphere. Therefore, nitrogen gas and aluminum component in the aluminum powder react, generating aluminum nitride. At this time, if the content of magnesium is smaller than 0.05 wt %, reduction by magnesium is not sufficient to uniformly generate aluminum nitride.

Aluminum nitride generated in the sintered aluminum alloy by direct nitriding reaction grows in fiber structure or in dendritic structure. More specifically, as shown in FIG. 3 which will be described with reference to the embodiments, aluminum nitride is generated and dispersed in aluminum alloy as laminer films.

In the conventional sintered aluminum alloy, as shown in FIG. 5 which will be described with reference to the embodiments, particles of aluminum nitride having single crystal structure exist in dispersed manner. The inventors have found that as aluminum nitride generated in the sintered aluminum alloy by direct nitriding reaction has fiber structure, superior sidability is provided as compared with the conventional sintered aluminum.

Now, when the depth direction of aluminum nitride is defined as the direction of growth in fiber structure, desirable thickness of aluminum nitride generated by the direct nitriding reaction is at most 2 μm and, more preferably, 1 μm or smaller. The reason is as follows. The thickness of aluminum nitride is approximately in proportion to the amount of generated aluminum nitride. When the amount of generated aluminum nitride is 11 wt %, the thickness of aluminum nitride is about 2 μm. Accordingly, that the thickness of aluminum nitride exceeds 2 μm means that the amount of generated aluminum nitride exceeds 11 wt %. In that case, degradation of machinability and toughness of the sintered aluminum alloy used specially as the valve spool is considerable. In view of machinability, the thickness of aluminum nitride is, more preferably, at most 1 μm.

(2) Porosity of Sintered Aluminum Alloy and Function-Effect Thereof

Pores exist dispersed on the sliding surface of the sintered aluminum alloy used for the gear rotor set or the valve, as sliding member in accordance with the present invention. The porous portions form concave pits at the sliding surface, where lubricant oil is held. Thus lack of oil film over the sliding interface is prevented, ensuring superior seizure resistance and wear resistance. Here, it is desired that porosity of the sintered aluminum alloy is at most 25 vol % of the total volume of sintered aluminum alloy. If porosity of the sintered aluminum alloy exceeds 25 vol %, mechanical strength of the sintered aluminum alloy degrades. Therefore, when the sintered aluminum alloy is used for the valve spool, there would be a problem of chipping of the valve spool when a metal part is press fit into the valve spool. Porosity of the sintered aluminum alloy is controlled by adjusting pressure at the time of press compaction of aluminum alloy powder as the raw material, adjusting extrusion ratio at the time of hot extrusion (plastic deformation ratio of the sintered body), or by adjusting pressure during hot forging.

In the gear rotor set, the sintered aluminum alloy used for the inner rotor and the sintered aluminum alloy used for the outer rotor have porosity in different ranges.

First, in the inner rotor, maximum stress acts on the inner diameter portion of the inner rotor which is in contact with the driving shaft formed of steel. Therefore, high hardness and high stiffness are required, in order to prevent wear and damage. Accordingly, porosity should preferably be 2 vol % to 10 vol %, and more preferably, 2 vol % to 6 vol %. If the porosity is smaller than 2 vol %, oil is not sufficiently held at the pores, resulting in seizure and abrasive wear. If the porosity exceeds 10 vol %, wear and damage are observed at the inner diameter portion of the inner rotor.

The stress acting on the outer rotor is not so large as that acting on the inner rotor. However, seizure resistance and wear resistance are required of the outer peripheral surface of the outer rotor which slides at higher speed among portions of the gear rotor set and of the sliding surface of the case in which the outer is sealed. Therefore, it is desired that the sintered aluminum alloy for the outer rotor has the porosity of 3 vol % to 15 vol %, and more preferably, 7 vol % to 10 vol %. If the porosity is smaller than 3 vol %, the effect of retaining oil at the pores is not sufficient, and therefore seizure (abrasive) wear occurs at the sliding surfaces of the pump case and the outer rotor. If porosity exceeds 15 vol %, mechanical strength of the sintered aluminum alloy degrades. Therefore, cracks are generated at a recessed portion of the teeth of the outer rotor, where stress is concentrated. Further, there would be problems in handling, that is, damage or chipping of the outer rotor when the outer rotor is conveyed.

The porosity of the sintered aluminum alloy can be controlled by adjusting density of the compact of the sintered aluminum alloy. Further, it can be controlled by adjusting amount of plastic deformation and pressure, when sintered aluminum alloy is plastically deformed by pressing and compacting in a metal mode.

As to the material of the pump case in which the outer rotor is sealed, there is not any restriction in alloy composition or mechanical characteristic. Ingot metallurgy aluminum alloy prepared by high pressure or low pressure aluminum casting may be used.

(3) Composition of Sintered Aluminum Alloy and Function-Effect Thereof

The sintered aluminum alloy used for a gear rotor set or a valve spool as the sliding member in accordance with the present invention contains, as needed, at least one, or two or more of silicon (Si), iron (Fe), nickel (Ni), chromium (Cr), titanium (Ti), Zirconium (Zr) and manganese (Mn). Desirably, the content of such element is at most 25 wt %. If the content of the element(s) exceeds 25 wt %, characteristics are not much improved, while toughness of the sintered aluminum alloy is degraded, and hardness and stiffness of aluminum alloy would be too high, causing problem in manufacturing, such as difficulty in hot extrusion.

The element mentioned above is added to the sintered aluminum alloy through the following method. First, aluminum alloy powder as the raw material is prepared by rapid solidification from aluminum alloy liquid metal having prescribed alloy composition containing necessary element mentioned above. More specifically, the aluminum alloy powder is provided by atomizing the melt aluminum alloy. The aluminum alloy powder is molded, heated and solidified, whereby the sintered aluminum alloy having a prescribed composition is prepared.

Addition of the element(s) mentioned above provides the following effects. When silicon is added, silicon is dispersed in the sintered aluminum alloy, improving wear resistance and seizure resistance of the sintered aluminum alloy. Addition of silicon by 20 wt % or more, however, causes a problem of degraded toughness of the sintered aluminum alloy. Further, as sintered aluminum alloy comes to have high stiffness, greater force would be required when an extrusion body is to be molded by hot extrusion. This possibly leads to large scale apparatus for extrusion, which is economically disadvantageous.

When iron, nickel, chromium, titanium or zirconium is contained, such metal element forms an intermetallic compound with aluminum, and is dispersed in the aluminum alloy. Consequently, heat resistance, stiffness and hardness of the sintered aluminum alloy are improved. As the heat resistance is improved, seizure between the sintered aluminum alloy and the mating material can significantly be suppressed at the time of sliding. Further, since intermetallic compound which is thermally stable is dispersed in fine and uniform manner in the aluminum alloy, growth of silicon crystal during heating and sintering can be suppressed. This significantly improves machinability of the sintered aluminum alloy. In order to attain such effect, it is necessary to add each element by at least 1 wt %.

When such element(s) is added in excess, the intermetallic compound of the element and aluminum would be coarse, degrading toughness and strength of the sintered aluminum alloy. Further, in the process of manufacturing the aluminum alloy powder, melting point of the aluminum alloy melt metal increases, resulting in higher manufacturing cost. This makes the aluminum alloy powder expensive, which is economically disadvantageous. Appropriate amounts of respective elements to be added are, according to the inventors' setting, 1 wt % to 8 wt % for iron, 1 wt % to 8 wt % for nickel, 1 wt % to 6 wt % for chromium, 1 w % to 4 wt % for titanium, and 1 wt % to 4 wt % for zirconium.

As for manganese, intermetallic compound of manganese and aluminum is formed. The intermetallic compound dispersed uniformly in the aluminum alloy provides the effect of improving mechanical strength of aluminum alloy and improving seizure resistance with the mating material at the time of sliding. In order to ensure such effect, manganese should be added by at least 1 wt %. If manganese exceeds 5 wt %, characteristics are not improved, while toughness of aluminum alloy degrades.

(4) Hard Particles

The sintered aluminum alloy used for a gear rotor set or a valve spool as the sliding number in accordance with the present invention contains as needed, at most 5 wt % of at least one, or two or more oxides selected from titanium oxide ($TiO_2$), zirconium oxide ($ZrO_2$), silicon oxide ($SiO_2$), magnesium oxide ($MgO_2$), aluminum oxide ($Al_2O_3$) and chromium oxide ($Cr_2O_3$). The oxide(s) is in the form of spherical hard particles. The oxide is dispersed in the sintered aluminum alloy, similar to aluminum nitride and silicon, to improve wear resistance and seizure resistance of the gear rotor set or the valve spool.

Therefore, the amount of added oxide should be at most 5 wt % of the total weight of sintered aluminum alloy. If the oxide is added by more than 5 wt %, wear resistance and seizure resistance of the sintered aluminum alloy are not much improved, while machinability of sintered aluminum alloy degrades, and the sintered aluminum alloy may attack the mating material. The inventors have found that in view of wear resistance and machinability of the sintered aluminum alloy, addition of titanium oxide, silicon oxide, magnesium oxide or aluminum oxide is more effective.

(5) Solid Lubricant Component and Function-Effect Thereof

To the sintered aluminum alloy used for a gear rotor set or a valve spool as the sliding member in accordance with the present invention, at least one, or two or more of lubricating components selected from graphite, molybdenum sulfide ($MoS_2$), tungsten sulfide ($WS_2$) and calcium fluoride ($CaF_2$) is added. Each lubricating component is dispersed on the sliding surface, forming concave oil pits. This prevents lack of oil film on the sliding interface, ensuring superior wear resistance and seizure resistance.

However, the amount of added lubricating component should preferably be at most 5 wt % with respect to the total weight of sintered aluminum alloy. More preferably, the amount should be 1 wt % to 3 wt %. When the lubricating component is added by more than 5 wt %, bonding strength of aluminum alloy powder particles with each other degrades, and therefore sufficient mechanical strength of the sintered aluminum alloy cannot be ensured.

(6) Relation Between Coefficients of Thermal Expansion of the Valve and the Valve Case, and Function and Effect Thereof The valve spool of the valve as the sliding member in accordance with the present invention is formed of a sintered aluminum alloy, while the valve case is formed of an aluminum cast alloy. The valve spool reciprocates and slides within the valve case. By the reciprocation and sliding, pressure and flow rate of oil are controlled. Performance thereof largely depends on the clearance between the valve spool and the valve case. When the clearance between the valve spool and the valve case becomes large, the problem of lower oil pressure or increased flow rate of oil results.

The inventors noted the fact that the clearance increases because of difference in coefficient of thermal expansion of the valve case and the valve spool, with the temperature of circulating oil being increased to about 120 to about 180° C., and found correlation between optimal coefficients of thermal expansion for controlling pressure and flow rate of oil. More specifically, when the relation $-3\times10^{-6}/°C. \leq (\alpha_c - \alpha_v) \leq 3\times10^{-6}/°C.$ is satisfied, pressure and flow rate of oil can appropriately be controlled, where $\alpha_v$ represents coefficient of thermal expansion of the sintered aluminum alloy for the valve spool, and $\alpha_c$ represents coefficient of thermal expansion of the aluminum cast alloy for the valve case.

If the value $(\alpha_c - \alpha_v)$ is larger than $3\times10^{-6}/°C.$, increase in clearance is larger than the appropriate value as the oil temperature increases, and hence pressure of oil decreases or flow rate of oil increases or varies. If the value $(\alpha_c - \alpha_v)$ is smaller than $-3\times10^{-6}/°C.$, diameter of the valve spool enlarges significantly when the oil temperature exceeds 120° C., so that the valve spool comes into contact with the valve case. This leads to the problem of excessive increase in oil pressure to be higher than the appropriate value, or decrease in the flow rate of oil.

In view of cost and productivity, aluminum silicon base alloy (ADC 12, AC4A, AC8A or A390) is used as the aluminum cast alloy used for the valve case. Coefficient of thermal expansion of this aluminum alloy is determined by the amount of silicon contained therein.

The coefficient of thermal expansion of the valve spool may be controlled by adjusting content of each element or compound in the sintered aluminum alloy. For example, the coefficient of thermal expansion can be set and controlled arbitrarily by adjusting the amount of added element such as aluminum nitride, silicon, iron, nickel or the like.

(7) Hardness of Hard Coating Formed at the Sliding Surface of Valve Case and Function-Effect Thereof A coating layer of alumite (i.e. formed by anodizing plating), Tuframe or similar hard coating layer having micro-Vickers hardness of 150 or more is formed as needed, on the sliding surface of the valve case which is in contact with the valve spool, in the valve as the sliding member in accordance with the present invention. Especially when foreign particles such as fine iron powder generated in the hydraulic path should enter between the valve spool and the valve case, formation of the coating mentioned above on the sliding surface of the valve case suppresses sticking. If the hardness of the hard coating is smaller than 150 micro-Vickers hardness, wear of the hard coating is significant when a foreign particle is pinched between the valve spool and the valve case, resulting in sticking.

The oil pump in accordance with another aspect of the present invention will be described.

Through various experiments and study, the inventors have found that wear and damage on an inner diameter surface of inner rotor 5b caused by attack from the rotary driving shaft can be suppressed by interposing-providing wear resistant member at a fitting surface 7 between rotary driving shaft 6 formed of steel and inner rotor 5b, in a gear rotor set 5 formed of aluminum alloy contained in a pump case 5c constituting an oil pump 10, as shown in FIG. 12. Consequently, it has become possible to form an oil pump employing an inscribed type gear rotor set formed of aluminum alloy with high cost efficiency.

The configuration of the oil pump in accordance with the present invention is as follows.

The oil pump in accordance with the present invention includes a pump case, an outer rotor, an inner rotor, and a rotary driving shaft formed of steel. The outer rotor is fixed in the pump case and has, on its inner peripheral surface, teeth in the shape in accordance with any of trochoid curve, involute curve and hypo-cycloid curve. The inner rotor is combined with the inner peripheral surface of the outer rotor, which has on its outer peripheral surface, teeth in a shape in accordance with any of trochoid curve, involute curve and hypo-cycloid curve, and has at the center, a through hole. The rotary driving shaft formed of steel is inserted to the through hole. The outer rotor is formed of an aluminum alloy containing 5 wt % to 30 wt % of silicon. The inner rotor is formed of a sintered aluminum alloy containing 0.1 wt % to 3.5 wt % of nitrogen. Nitrogen exists in the sintered aluminum alloy in the form of aluminum nitride. A wear resistant member is placed entirely or partially on the fitting surface of the inner rotor and the rotary driving shaft formed of steel.

Preferably, the wear resistant member is a plate member press fit to the fitting surface. In the specification, "plate member" refers not only to a member having planar surface but also a member having curved surface such as an organic material member 9 in FIG. 14B.

Preferably, the material for the plate member is selected from the group consisting of iron based alloy, copper based alloy, aluminum based alloy, titanium based alloy, nickel based alloy, organic material, oxide, nitride, carbide and boride.

Preferably, the organic material is resin material.

The resin material should preferably be selected from the group consisting of thermosetting resin, polyimide, polyamide and polyamide-imide.

Preferably, the wear resistant member is a hard coating formed on an inner surface of the through hole.

The material of the hard coating is preferably selected from the group consisting of Ni, hard alumite, TiN, TiCr and TiAl.

Preferably, the wear resistant member has micro-Vickers hardness of at least 250.

Preferably, the pump case is formed of a cast aluminum alloy, and the outer rotor is formed of a sintered aluminum alloy.

The oil pump in accordance with the present invention will be described in greater detail.

(1) Wear resistant member inserted between the inner diameter surface of the through hole of inner rotor and driving shaft formed of steel The feature of the present invention is that wear and damage or laminer peeling is suppressed as shock from the rotating driving shaft formed of steel is received not directly by the inner diameter surface of the inner rotor but a press fit member 8 having high wear resistance, high stiffness, high elasticity and high deformability, provided on the inner diameter surface of inner rotor 5b, as shown in FIG. 13, for example. In FIG. 13, outer rotor 5a is positioned in pump case 5c, and inner rotor 5b is provided engaging the outer rotor, in oil pump 10. The press fit member 8 is provided between inner rotor 5b and rotary driving shaft 6. An organic material member 9 as a plate member may be provided entirely over the inner diameter surface of inner rotor 5b, as shown in FIG. 14B.

By such a structure, it becomes possible to prevent various problems such as noise and vibration generated when the rotary driving shaft 6 and the inner surface of the through hole of inner rotor 5b come to contact with each other during pump operation, or wear and damage of other portions caused by the abraded powder of inner rotor 5b.

As in a conventional oil pump, there is a clearance between the member inserted to the inner diameter surface of inner rotor 5b and the rotary driving shaft which is brought into contact therewith. However, as the material having the above described characteristic is used as an insertion member, wear and damage of the press fit member 8 can be suppressed, and hence wear an damage of inner rotor 5b can be suppressed.

A plate member press fit into the fitting surface may be used as the wear resistant member. It is possible to select, as the material of the plate member, one from iron based alloy, copper based alloy, aluminum based alloy, titanium based alloy, nickel based alloy, organic material, oxide, nitride, carbide and boride. Economically, metal based material is preferred. The metal based material may be prepared by ingot metallurgy or powder metallurgy. In view of shaping, a member can be fabricated at low cost by powder metallurgy. Iron based sintered member is most cost effective.

As the organic material, phenol based or acrylic thermosetting resin, or polyimide, polyamide, polyamide-imide may be used. Resin has high elasticity and high deformability. Therefore, even when attacked or pressed by the driving shaft, only the organic material itself deforms, and wear or damage is not caused. Therefore, it can be used as a member to be inserted to the inner diameter side of the inner rotor.

Generally, temperature of oil circulating in the oil pump is lower than 200° C. Therefore, generally, phenol based thermosetting resin, which is inexpensive, may be used. However, when an environment where oil temperature exceeds 200° C. is expected, softening temperature of phenol based or acrylic thermosetting resin is exceeded, resulting in wear and damage during operation. In such a case, it is desirable that resin having superior heat resistance such as polyimide, polyamide or polyamide-imide is used.

In addition to the inorganic material such as metal and organic material such as resin, composite material containing organic and inorganic materials may be similarly applicable. For example, a composite material prepared by mixing and compacting metal powder and resin powder, or a composite material prepared by mixing and compacting ceramics particles and resin particles has high wear resistance and high elasticity-deformability. Therefore, when used as the insertion member to the inner diameter surface of the inner rotor and attack or pressed by the rotary driving shaft, only the organic material deforms, and wear and damage can be prevented.

As to the method of inserting the member formed of the inorganic material, the organic material or organic-inorganic composite material to the inner diameter side of the inner rotor, press fit is industrially the commonest. In order to attain strong bonding force at the interface between the inner rotor and the press fit member, heat treatment may be performed as needed after press fit, if the material is an inorganic material, whereby a diffusion layer can be formed at the contact interface between the inner rotor and the press fit member. In case of an organic material or an organic/inorganic composite material, application of an adhesive is effective. Alternatively, the inner rotor and the press fit member may be joined by welding, by applying a high density energy such as laser locally, or to the entire surface. Further, brazing is another relatively easy method.

It is necessary that the wear resistant member to be inserted to the inner diameter surface of the inner rotor has micro-Vickers hardness of at least 250. If micro-Vickers hardness is lower than 250, the inserted member would be worn and damaged by the attack by the driving shaft and, as a result, noise or vibration would be generated during pump operation and further, wear and damage of other portions caused by abrasive powder of inner rotor may possibly result.

(2) Hard coating covering the inner diameter surface of the inner rotor to be fit with the rotary driving shaft formed of steel In this case also, as in the case (1) described above, the shock from the rotary driving shaft is received not directly by the inner diameter surface of the inner rotor but by the hard coating having wear resistance and bearing fatigue resistance covering the inner diameter surface, and therefore wear and damage can be suppressed. Preferably, the hard coating has micro-Vickers hardness of at least 250. If micro-Vickers hardness is lower than 250, the problem of wear and damage of the wear resistant coating would be caused by the shock from the rotary driving shaft. Hard alumite, nickel plating layer as well as TiN, TiCr, TiAl coating layer may be used as the hard coating.

The present invention is applicable not only to the inscribed gear rotor set formed of cast aluminum alloy but also to inscribe gear rotor set formed of sintered aluminum alloy. Further, it is possible to form a light weight oil pump formed entirely of aluminum, with the pump case prepared by cast aluminum alloy.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 14A and 14B are cross sections of the inner rotor, wherein FIG. 14A is a cross section of the inner rotor without press fit member, and FIG. 14B is a cross section of the inner rotor with a press fit member.

DESCRIPTION OF THE PREFERRED EMBODIMENTS

Figure 1:
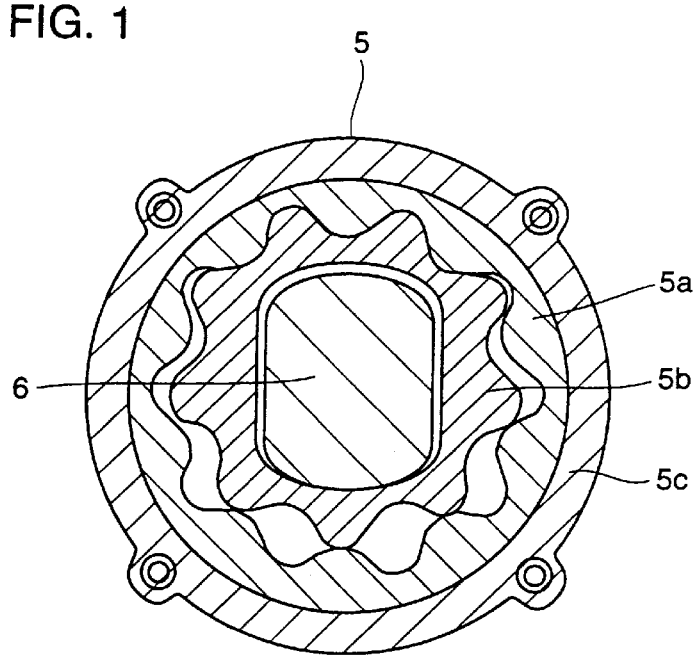
FIG. 1 is a cross section of a gear rotor set in accordance with one embodiment of the present invention.

The gear rotor set and the valve in accordance with an embodiment of the present invention will be described with reference to the figures. Referring to FIG. 1, a gear rotor set 5 includes an outer rotor 5a and an inner rotor 5b sliding within outer rotor 5a. Outer rotor 5a and inner rotor 5b are both formed of sintered aluminum alloy. A rotary driving shaft 6 is inserted through inner rotor 5b. Outer rotor 5a has, on its inner peripheral surface, teeth of which shape is based on any of trochoid curve, involute curve and hypo-cycloid curve. Inner rotor 5b has on its outer peripheral surface, teeth of which shape is based on any of trochoid curve, involute curve and hypo-cycloid curve. Inner and outer rotors 5b and 5a are set in a pump case 5c formed of an ingot metallurgy aluminum alloy.

Figure 2:
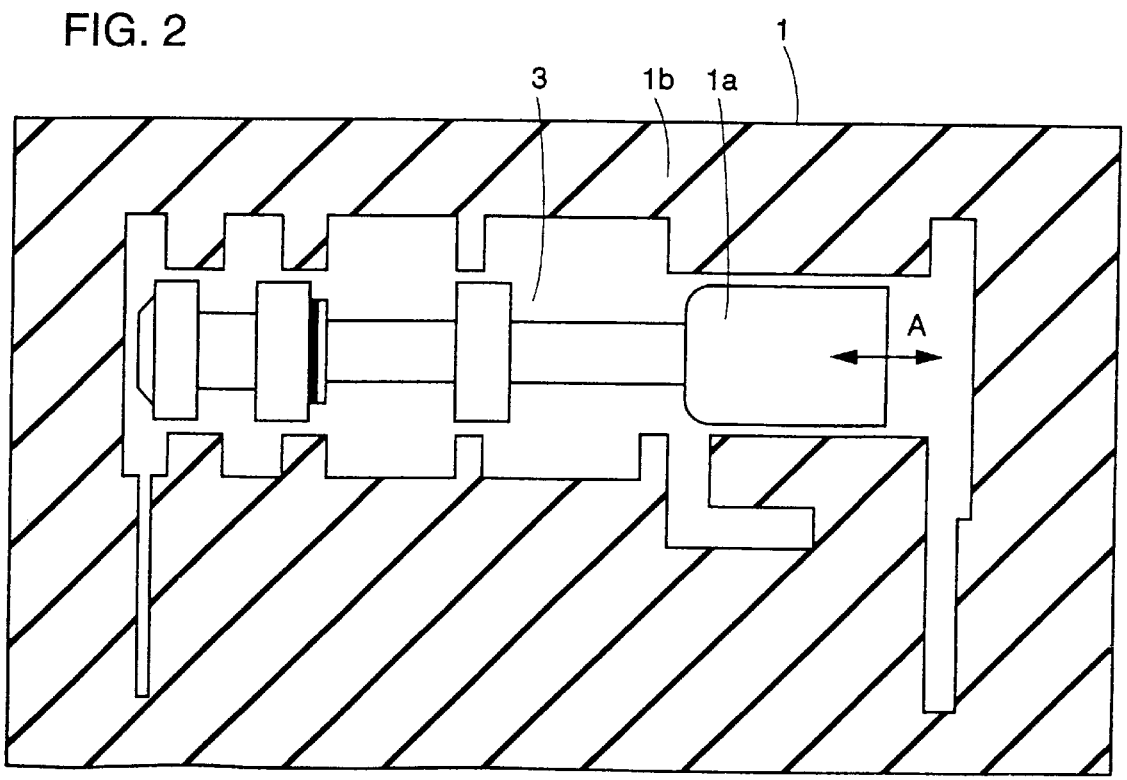
FIG. 2 is a cross section of a valve in accordance with an embodiment of the present invention.

Referring to FIG. 2, a valve 1 includes a valve case 1b and a valve spool 1a which reciprocates and slides as represented by the arrow A, in valve case 1b. Valve spool la formed of a sintered aluminum alloy has a substantially columner shape, with a groove 3 formed on its peripheral surface. Valve case 1b is formed of an aluminum cast alloy.

The gear rotor set and valves formed of sintered aluminum alloys of various compositions were evaluated. Details of evaluation will be described in the following, referring to specific examples.

(Example 1)

Aluminum alloy powder A (Al-17% Si-3.5% Cu-1% Mg-0.5% Mn (represented in percentage by weight)) and aluminum alloy powder B (Al-12% Si-5% Fe-6% Ni-1% Cr (represented in percentage by weight)) were prepared as raw material powders. Powder A was used for the outer rotor (outer diameter φ=90 mm, thickness=10 mm) having 10 teeth. Powder B was used for the inner rotor (thickness=10 mm) having 9 teeth. The outer rotor was formed by the combination of sintering and sizing. The inner rotor was formed by the combination of hot forging and machining.

Manufacturing of the outer rotor by the combination of sintering and sizing will be described. Powder A was filled in a metal mold having a prescribed shape and compacted under the pressure of bearing pressure 7 t/cm². Thereafter, the powder compact body was heated and held in nitrogen atmosphere at a temperature of 540° C. for 2 hours. Porosity of the resulting sintered aluminum alloy was 5%. The sintered aluminum alloy was heated to 150° C. in an inert gas atmosphere. Thereafter, the alloy is inserted to a metal mold (mold temperature=room temperature) for sizing having a prescribed dimension and shape, and subjected to pressurizing and compacting with bearing pressure of 6 t/cm², whereby the outer rotor was formed. A lubricant prepared by dissolving stearic acid in a methanol solvent was applied to an inner wall of the metal mold for sizing.

The method of manufacturing an inner rotor combining hot forging and machining will be described. Powder B was supplied to a metal mold for compacting having a prescribed shape, and compacted under the bearing pressure of 6 t/cm². Thereafter, the powder compact body was heated and held in a nitrogen atmosphere at 530° C. for 30 minutes. Immediately thereafter, the powder compact body was inserted to a metal mold (mold temperature=400° C.) for hot forging having a prescribed dimension and shape, and is pressed and compacted under the bearing pressure of 8 t/cm². Thereafter, the material of the aluminum forged body was subjected to machining so as to form teeth, for example, and the inner rotor was thus fabricated. A lubricant prepared by dissolving carbon in water was applied to the inner wall of the metal mold for hot forging.

For comparison, an outer rotor and an inner rotor (comparative example 1) and an outer rotor and an inner rotor (comparative example 2) having the same dimension and same shape as the above described outer rotor and inner rotor, respectively, were fabricated by sizing, pressurizing and compacting sintered aluminum alloy, and by hot forging and machining, respectively. Conditions for sizing and machining were the same as those for the present invention.

Tip clearance of the inner rotors and outer rotors for respective gear rotor sets were measured. The tip clearance was measured as a clearance between tip ends of the teeth, and average value and width of variation (maximum value−minimum value) were calculated. The results are as shown in Table 1 below.

As can be seen from Table 1, the average value and the width of variation of the tip clearance in the gear rotor set in accordance with the present invention were found to be smaller than comparative example 1. Further, the values were found to be at the comparable level as comparative example 2. As a result, it has been found that by the manufacturing method described above, a gear rotor set having high dimensional precision can be formed.

TABLE 1

| | Method of Manufacturing Rotor | | Tip Clearance ($\mu$m) | |
|---|---|---|---|---|
| | outer | inner | average value | width of variation |
| Present Invention | sizing | machining | 34 | 11 |
| Comparative Example 1 | sizing | sizing | 53 | 23 |
| Comparative Example 2 | machining | machining | 26 | 8 |

(Second Example)

The gear rotor sets fabricated in accordance with the first example were incorporated in oil pumps formed of ADC12 (Al-12 wt % Si die cast material). Performance evaluation test of the gear rotor set was conducted under the following condition: number of rotation, 4500 rpm; oil pressure, 1.5 Mpa, oil temperature, 120° C.; and continuous operation for 3 hours. Tip clearance (average value) of the gear rotor sets and volume efficiency of the pumps before and after the performance evaluation test were measured. The results are as shown in Table 2 below.

As can be seen from Table 2, wear or damage was not observed at the sliding portions of the outer and inner rotors in the gear rotor set of the present invention. The value of tip clearance at the teeth was not much varied before and after the performance evaluation test and, accordingly, volume efficiency of the pump was not much varied and kept at 75% or higher.

In comparative example 1, tip clearance at the teeth was relatively large before the performance evaluation test, and the volume efficiency was 64%. As wave portion of the inner rotor were worn and damaged during the performance evaluation test, the tip clearance after the test was much increased. As a result, volume efficiency was degraded to 50%. Further, it was observed that the inner diameter portion of the inner rotor which was in contact with the rotary driving shaft was worn because of the attack by the rotary driving shaft.

In comparative example 2, the tip clearance of the teeth was not much varied before and after the performance evaluation test. Wear or damage of the inner and outer rotors were not observed, and the result was satisfactory.

The wear and damage observed in comparative example 1 was considered to be derived from insufficient strength and hardness of the inner and outer rotors which were formed of sintered aluminum alloy. In the example of the present invention and comparative example 2, the sintered aluminum alloy prepared by hot forging was applied to inner rotors, and therefore the inner rotors had sufficient strength and hardness. This is why the inner rotors were free of wear or damage. Accordingly, it has been found that it is difficult to apply an inner rotor of which teeth are formed by dimension sizing process such as sizing, when a high oil pressure is applied, or high stress is applied from the rotary driving shaft.

TABLE 2

| | Tip clearance ($\mu$m) | | Volume efficiency (%) | | |
|---|---|---|---|---|---|
| | before test | after test | before test | after test | Remarks (damage to rotors) |
| Present Invention | 34 | 37 | 78 | 76 | No damage observed |
| Comparative Example 1 | 53 | 88 | 64 | 51 | Wear observed on inner rotor |
| Comparative Example 2 | 26 | 28 | 83 | 80 | No damage observed |

(Third Example)

Aluminum alloy powder A (Al-12% Si-3.5% Cu-1% Mg-0.5% Mn (represented in percentage by weight)) and aluminum alloy powder B (Al-12% Si-5% Fe-6% Ni-1% Cr (represented in percentage by weight)) were prepared as raw material powders. Aluminum alloy powder A was used for an outer rotor (outer diameter $\phi$=90 mm, thickness=10 mm) having 10 teeth, and aluminum alloy powder B was used for an inner rotor (thickness=100 mm) having 9 teeth. The outer rotor was formed by the combination of sintering and sizing, while the inner rotor was formed by the combination of hot forging and machining.

First, influence of porosity of the sintered aluminum alloy on dimensional precision of the teeth portion of the outer rotor after sizing, in manufacturing the outer rotor will be discussed. Aluminum alloy powder A was supplied to a metal mold for compacting having a prescribed shaped, and press compacted under the bearing pressure of 5 to 10 t/cm². Thereafter, the powder compact body was heated and held in a nitrogen atmosphere at 540° C. for 2 hours. Average porosity of the resulting sintered aluminum alloy was 2 to 28 vol %. The sintered aluminum alloy was heated to 150° C. in an inert gas atmosphere. The resulting sintered aluminum alloy was inserted to a metal mold (mold temperature=room temperature) having a prescribed dimension and shape, and pressurized and compacted under the bearing pressure of 6 t/cm², whereby the outer rotor was formed. A lubricant prepared by dissolving stearic acid in a methanol solvent was applied to the inner wall of the metal mold.

The inner rotor was fabricated under the same condition as in the first example. More specifically, aluminum alloy powder B was supplied to a metal mold for compacting having a prescribed shape, and press compacted under the bearing pressure of 6 t/cm². Thereafter, the powder compact body was heated and held in a nitrogen atmosphere at 530° C. for 30 minutes. Thereafter, the aluminum alloy powder compact body was put into a metal mold (mold temperature=400° C.) for hot forging having a prescribed dimension and shape, and pressurized and compacted under the bearing pressure of 8 t/cm². The resulting aluminum alloy forged material was subjected to machining, and the inner rotor was thus fabricated. A lubricant prepared by dissolving carbon in water was applied to the inner wall of the metal mold for hot forging.

Porosity of the sintered aluminum alloy material before sizing, and measurements of tip clearances of respective gear rotor sets after sizing are given in Table 3 below. As to the value of tip clearance, average value and width of variation (maximum value–minimum value) were calculated.

As can be seen from Table 3, when porosity of the sintered aluminum alloy material before sizing is within the optimal range (at most 15 vol %) (sample Nos. 1, 2, 3, 4), tip clearance of respective gear rotor sets were relatively small, that is, about 30 to about 35 μm.

TABLE 3

| No. | Bearing pressure for compacting (t/cm²) | Porosity of sintered body (%) | Tip clearance (μm) | | Remarks |
|---|---|---|---|---|---|
| | | | average value | width of variation | |
| 1 | 6 | 14 | 30 | 12 | No damage observed |
| 2 | 7 | 9 | 30 | 11 | No damage observed |
| 3 | 8 | 4 | 32 | 12 | No damage observed |
| 4 | 10 | 2 | 33 | 13 | No damage observed |
| 5 | 5 | 22 | 28 | 10 | No damage observed |

(Nos.1,2,3,4; Examples of the Invention, No. 5; Comparative Example (Fourth Example)

The gear rotor sets (Nos. 2 to 5) of Table 3 prepared in the third example are incorporated in oil pumps formed by ADC12 (Al-12 wt % Si, die cast material), and performance evaluation test was performed under the following condition: number of rotation, 4500 rpm; oil pressure, 1.5 Mpa; oil temperature, 120° C.; continuous operation for 3 hours. Tip clearances (average value) of respective gear rotor sets and volume efficiency of the pumps before and after the performance evaluation test were measured. The results are as shown in Table 4 below. In Table 4, gear rotor sets Nos. 1 to 4 correspond to gear rotor sets Nos. 2 to 5 of Table 3, respectively.

As can be seen from Table 4, gear rotor sets Nos. 1, 2 and 3 are free of any wear or damage at the sliding portions of the outer and inner rotors. The tip clearance at the teeth portion was not much changed before and after the performance evaluation test. As a result, the volume efficiency of the pump was not much changed and kept at 75% or higher.

In the comparative example No. 4, the sintered aluminum alloy material had the porosity of 22%, and therefore the tip clearance of the wave portion could be made relatively small by sizing, and hence it was possible to ensure high dimensional precision of the gear rotor set. However, as the sintered aluminum alloy material did not have sufficient strength, wear and damage were observed at the teeth portion of the outer rotor during the performance evaluation test. As a result, tip clearance was increased and accordingly, volume efficiency of the pump decreased.

TABLE 4

| No. | Tip clearance (μm) | | Volume efficiency (%) | | Remarks (damage to rotors) |
|---|---|---|---|---|---|
| | before test | after test | before test | after test | |
| 1 | 30 | 33 | 80 | 77 | No damage observed |
| 2 | 30 | 32 | 81 | 78 | No damage observed |
| 3 | 32 | 34 | 78 | 75 | No damage observed |
| 4 | 28 | 68 | 83 | 51 | Wear and damage observed locally at teeth portion |

(Nos.1,2,3; Examples of the Invention, No. 4; Comparative Example (Fifth Example)

Aluminum alloy powder A (Al-15% Si-1% Mg (represented in percentage by weight)), aluminum alloy powder B (Al-17% Si-3.5% Cu-1% Mg (represented in percentage by weight)), and aluminum alloy powder C (Al-12% Si-5% Fe-6% Ni -1% Cr (represented in percentage by weight)) were prepared as raw material powders. An aluminum alloy mixed powder containing aluminum alloy powder A (30 wt %) and aluminum alloy powder B (70 wt %) mixed to each other at the weight ratio of 1:1 was used for an outer rotor (outer diameter φ=90 mm, thickness=10 mm) having 10 teeth. Aluminum alloy powder C was used for an inner rotor (thickness=10 mm) having 9 teeth. The outer rotor was formed by the combination of sintering and sizing. The inner rotor was formed by the combination of hot forging and machining.

First, the method of manufacturing the outer rotor will be described. The aluminum mixed powder described above was supplied to a metal mold for compacting having a prescribed shape, and press compacted under bearing pressure of 6.5 t/cm². The powder compact body was heated and held in a nitrogen atmosphere at 550° C. for 4 hours. At this time, aluminum and nitrogen gas reacted at the surface of aluminum alloy powder A, generating aluminum nitride. Under the condition, the amount of generated aluminum nitride was 3.5 wt %. It was recognized that the porosity of the sintered aluminum alloy was 8 vol %. The sintered aluminum alloy was heated to 180° C. in an inert gas atmosphere. Thereafter, the sintered aluminum alloy was put into a metal mold (mold temperature=130° C.) for sizing having a prescribed dimension and shape, pressurized and compacted under the bearing pressure of 6 t/cm². A lubricant prepared by dissolving stearic acid in a methanol solvent was applied to the inner wall of the metal mold.

The method of manufacturing the inner rotor will be described next. Aluminum alloy powder C was supplied to a metal mold for compacting having a prescribed shape, and press compacted under the bearing pressure of 6 t/cm². The aluminum alloy powder compact body was heated and held in a nitrogen atmosphere at 530° C. for 30 minutes. Thereafter, the aluminum alloy powder compact body was put in a metal mold (mold temperature=400° C.) for hot forging having prescribed dimension and shape, and pressed and compacted under the bearing pressure of 8 t/cm². The resulting sintered aluminum alloy forged body was subjected to machining, and the inner rotor was formed. A lubricant prepared by dissolving carbon in water was applied to the inner wall of the metal mold for hot forging.

For comparison, an outer rotor and an inner rotor (comparative example 1) and an inner rotor and an outer rotor (comparative example 2) having the same dimension and same shape as the above described outer rotor and inner rotor, and formed by sizing and by the combination of hot forging and machining, respectively, were fabricated. Conditions of sizing, hot forging and machining were the same as those for the method described above.

Tip clearances of respective gear rotor sets were measured. The results are as shown in Table 5 below. For the tip clearance, average value and width of variation (maximum value–minimum value) were calculated.

As can be seen from Table 5, though the sintered aluminum alloy material before sizing contained aluminum nitride as hard particles, the resulting gear rotor set in accordance with the present invention has smaller average value and smaller width of variation of tip clearance than comparative example 1 and the resulting values were at the similar level as comparative example 2. More specifically, it has been found that by the above described manufacturing method, a gear rotor set having high dimensional precision can be obtained.

TABLE 5

| Method of Manufacturing Rotor | | Tip Clearance (μm) | |
| --- | --- | --- | --- |
| outer | inner | average value | width of variation |
| Present Invention | machining | sizing | 32 | 11 |
| Comparative Example 1 | sizing | sizing | 53 | 23 |
| Comparative Example 2 | machining | machining | 26 | 8 |

(Only the example of the invention contains 3.5 wt % AlN hard particles)

(Sixth Example)

Aluminum alloy powder A (Al-15% Si-1% Mg (represented in percentage by weight)) and aluminum alloy powder B (Al-12% Si-5% Cu-6% Fe-1% Cr (represented in percentage by weight)) were prepared as the raw material powders. Aluminum alloy powder A was used for an outer rotor (outer diameter φ=90 mm, thickness=10 mm) having 10 teeth. Aluminum alloy powder B was used for an inner rotor (thickness=10 mm) having 9 teeth. The outer rotor was formed by the combination of sintering and sizing. The inner rotor was fabricated by the combination of hot forging and machining.

Outer rotors and inner rotors having various porosity were fabricated. The fabricated gear rotor sets were incorporated in oil pumps formed of ADC12 (Al-12 wt % Si, die cast material). Performance evaluation test was performed under the following condition: number of rotation, 4500 rpm; oil pressure, 1.5 Mpa; oil temperature, 120° C.; continuous operation for 3 hours. The results are as shown in Table 6.

As can be seen from Table 6, in Examples Nos. 1 to 5, wear, damage or sticking was not observed on the sliding surfaces of the outer and inner rotors, and the results were satisfactory.

Comparative examples were suffered from the following problems. In Nos. 6 and 7, strength was degraded as the inner rotor had relatively large number of pores, and inner diameter portions of the inner rotors were worn because of the attack by the shaft (rotary driving shaft). In No. 8, the outer rotor had relatively small number of pores, and therefore lubricant oil was not sufficiently held, resulting in abrasive wear between the outer rotor and the case.

TABLE 6

| No. | Outer rotor porosity (%) | Inner rotor porosity (%) | State of Wear and Damage | |
| --- | --- | --- | --- | --- |
| | | | outer rotor | inner rotor |
| 1 | 15 | 1 | Good, no damage observed | Good, no damage observed |
| 2 | 11 | 1 | Good, no damage observed | Good, no damage observed |
| 3 | 8 | 0 | Good, no damage observed | Good, no damage observed |
| 4 | 5 | 1 | Good, no damage observed | Good, no damage observed |
| 5 | 3 | 0 | Good, no damage observed | Good, no damage observed |
| 6 | 8 | 4 | Good, no damage observed | Wear and damage observed at inner diameter portion in contact with shaft |
| 7 | 8 | 7 | Good, no damage observed | Wear and damage observed at inner diameter portion in contact with shaft |
| 8 | 1 | 0 | Abrasive wear with case observed | Good, no damage observed |

Nos.1~5; Examples of the Invention, Nos. 6~8 Comparative Examples
(Only the example of the invention contains 3.5 wt % AlN hard particles)

(Seventh Example)

Figure 3:
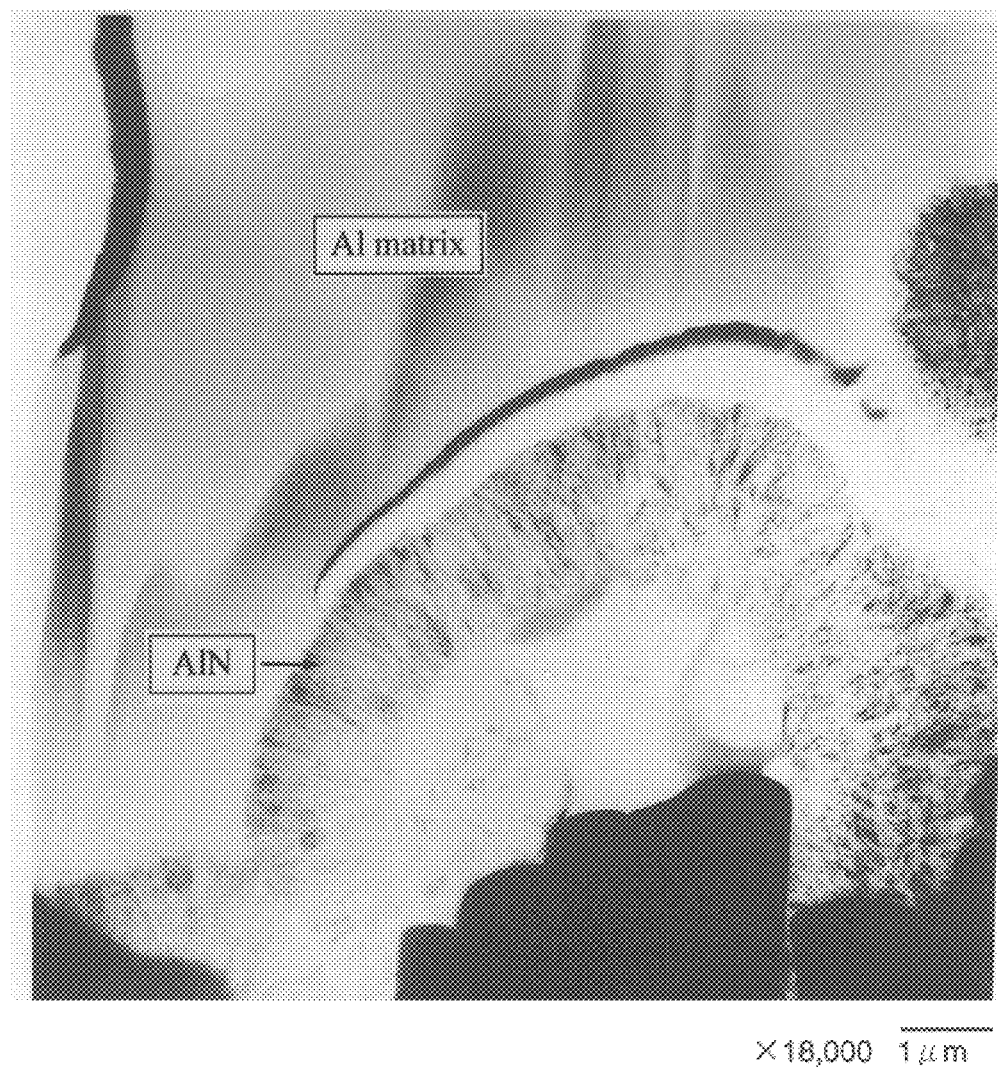
FIG. 3 is a TEM photograph of sintered aluminum alloy formed by direct nitriding reaction.
Figure 4:
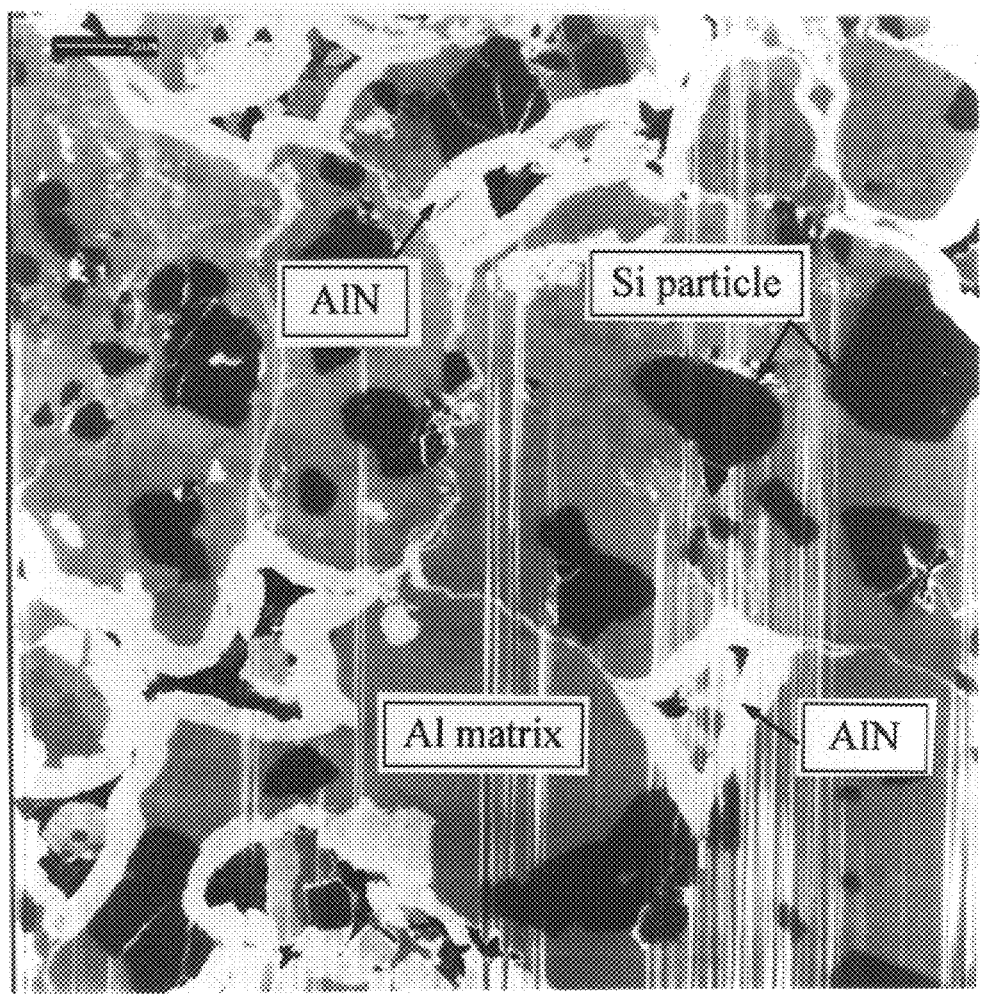
FIG. 4 is an SIM photograph of sintered aluminum alloy formed by direct nitriding reaction.
Figure 5:
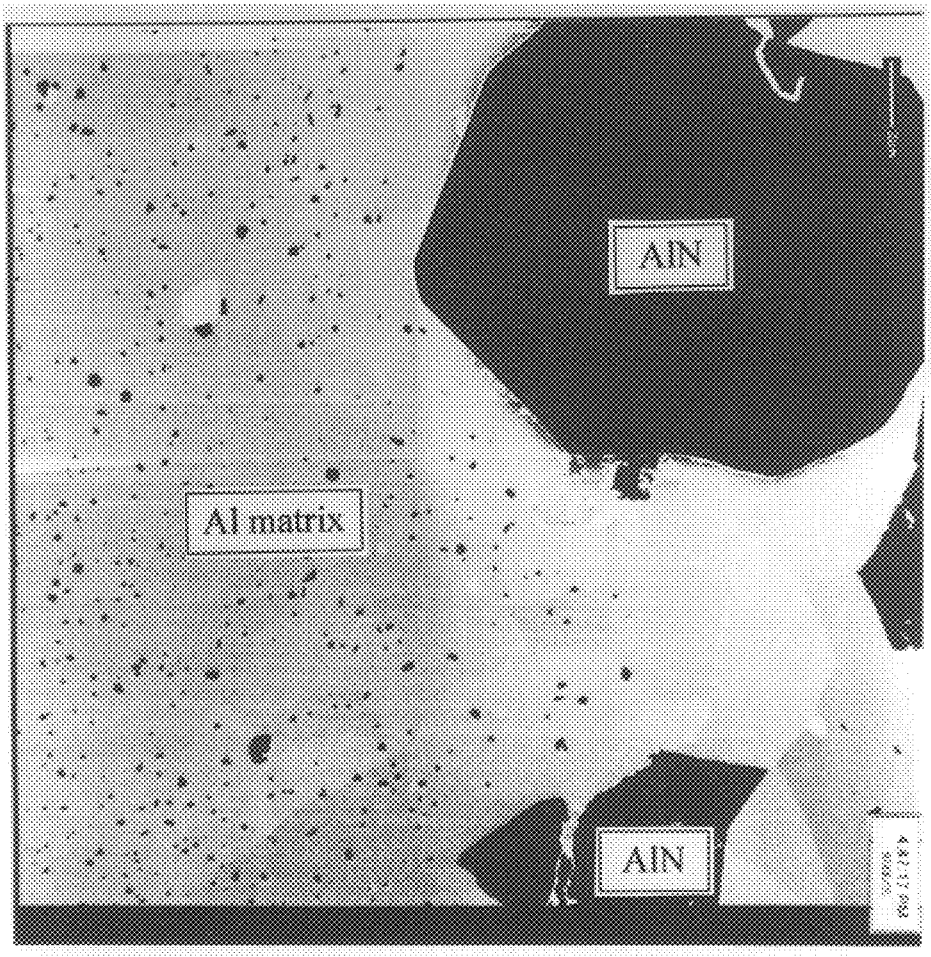
FIG. 5 is an SIM photograph of sintered aluminum alloy formed by adding aluminum nitride particles.

FIG. 3 shows TEM image of aluminum nitride particles generated and dispersed in the sintered aluminum alloy (alloy composition: Al-12% Si-2% Ni-1% Mg-2% AlN (in percentage by weight)) after hot extrusion, fabricated by direct nitriding reaction described above. FIG. 4 shows an SIM image thereof. FIG. 5 shows, for comparison, an SIM image of aluminum nitride particles dispersed in conventional sintered aluminum alloy (prepared by adding and mixing aluminum nitride particles (average grain diameter of 22 μm) to the sintered aluminum alloy having the same composition as above, compacting and sintering the same).

As can be seen in FIGS. 3 and 4, aluminum nitride generated by direct nitriding reaction grows in one direction in fiber or dendritic structure. Assuming that the direction of growth of the aluminum nitride is the thickness direction, it can be seen that the aluminum nitride has the thickness of about 1 μm.

By contrast, referring to FIG. 5, in the sintered aluminum alloy manufactured through the conventional method, particles of aluminum nitride do not have the fiber structure, but single crystal structure. Therefore, the structure of aluminum nittride particles in the sintered aluminum alloy obtained by direct nitriding reaction is very much different from the structure of aluminum nitride particles in sintered aluminum alloy fabricated through the conventional method.

(Eighth Example)

Figure 6:
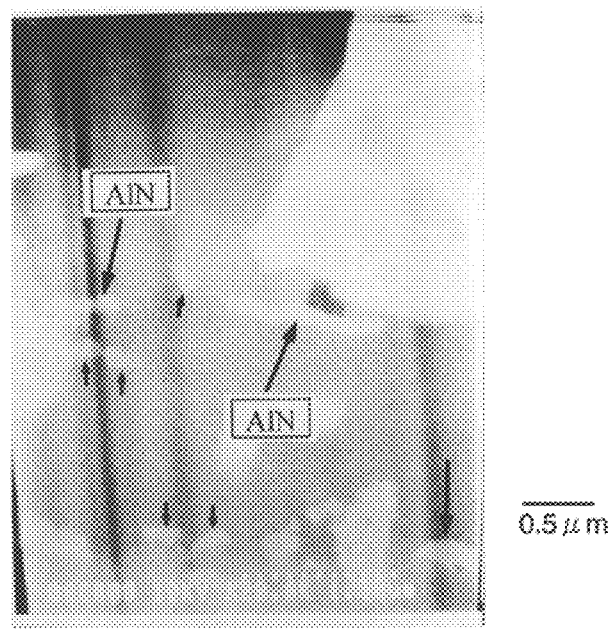
FIG. 6 is an electron microscope photograph showing texture of sintered aluminum alloy formed by direct nitriding reaction.
Figure 7:
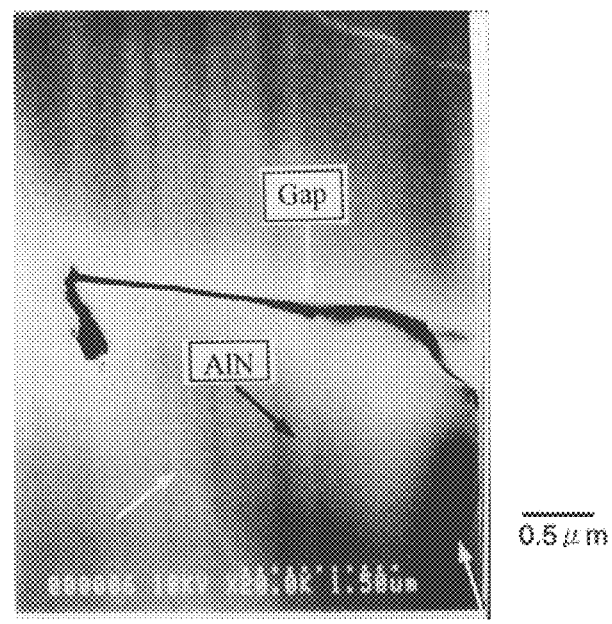
FIG. 7 is an electron microscope photograph showing texture of sintered aluminum alloy formed by adding aluminum nitride particles.

FIG. 6 shows an electron microscope photograph showing texture of the sintered aluminum alloy after hot extrusion, fabricated by direct nitriding reaction described above. The alloy composition of the sintered aluminum alloy is the same as that of the seventh example. FIG. 7 is an electromicroscope photograph showing texture of the conventional sintered aluminum alloy, for comparison.

Referring to FIG. 6, there is not a gap or space between aluminum nitride particles (denoted by block arrows) generated by direct nitriding reaction and the aluminum alloy matrix, and it can be seen that the particles and the matrix are bonded.

Referring to FIG. 7, in the conventional sintered aluminum alloy, there is a gap between aluminum nitride particles (denoted by block arrows) and aluminum alloy.

(Ninth Example)

Aluminum alloy powders having alloy compositions as represented in Table 7 mixed with spherical particles of oxide (average grain diameter 5 to 10 µm) and lubricating particles (average grain diameter 5 to 15 µm) as lubricating component, as needed, were prepared as raw material powders. Respective raw material powders were heated and sintered in nitrogen atmosphere, so that aluminum nitride was generated in the sintered aluminum alloys. The sintered aluminum alloys were subjected to hot extrusion and machining, so as to fabricate valve spools (diameter=15 mm, overall length=29 mm). Porosity of the valve spools were adjusted to 2 to 3 vol % by adjusting conditions of compacting and extrusion. Valve cases were fabricated using ingot metallurgy aluminum alloy (JIS AC8A material). Wear resistance (amount of wear of valve spool and valve case) of the sintered aluminum alloys of valve spools in ATF as well as seizure resistance (presence/absence of seizure and sticking) were evaluated.

The results are as shown in Table 8 below. Wear characteristic was evaluated by tip on disk thrust test. For comparison (No. 27), similar evaluation was performed using a valve case having alumite coating (micro-Vickers hardness MHv=180) provided on the surface of ingot metallurgy aluminum alloy.

Figure 8:
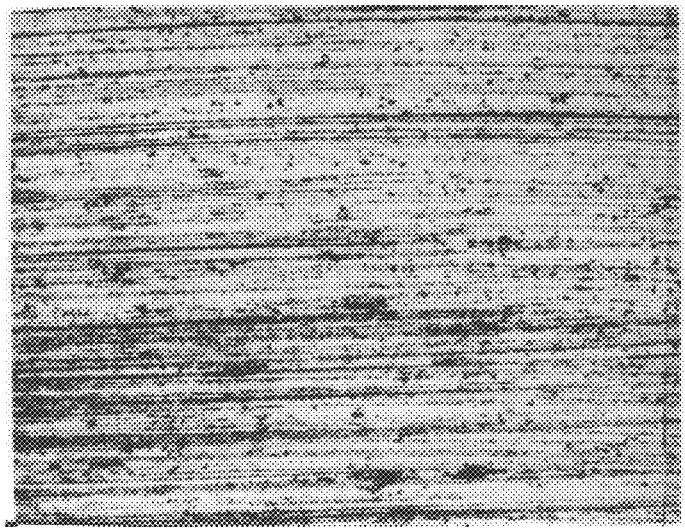
FIG. 8 is an optical microscope photograph of a sliding surface after friction test of sintered aluminum alloy formed by direct nitriding reaction.

The sintered aluminum alloys (Nos. 1 to 19) of the valve spools in accordance with the present invention had superior wear resistance and seizure resistance of sintered aluminum alloys themselves, as shown in FIG. 8. Therefore, even without alumite coating on the surface of the sintered aluminum alloys, wear or sticking was not observed, and attack against the valve case as the mating material was negligible. Accordingly, it has been found that the sintered aluminum alloy in accordance with the present invention is suitable as a material for the valve spool.

Comparative examples (Nos. 20 to 27) suffered from the following problems. In No. 20, aluminum nitride was not contained in the sintered aluminum alloy, and therefore sufficient wear resistance and appropriate characteristic against attacking by the mating material were not ensured. In No.21, the amount of aluminum nitride contained in the sintered aluminum alloy was as small as 0.3 wt %, and hence sufficient wear resistance and appropriate characteristic against attacking by the mating material were not ensured. In No. 22, the content of aluminum nitride in the sintered aluminum alloy was as large as 7.3 wt %, so that it attacked the mating material considerably, resulting in abrasive wear. In No. 23, the total amount of added alloy components in the sintered aluminum alloy exceeded 25 wt %, so that it attacked the mating material, resulting in abrasive wear on the sliding surface of the mating material. In No. 24, the content of oxide particles was as large as 6 wt %, so that it attacked the mating material considerably, resulting in abrasive wear. In No. 25, the content of oxide particles was as large as 6 wt %, so that it attacked the mating material considerably, resulting in abrasive wear. In No. 36, the content of lubricating particles as the lubricating component was as large as 6 wt %, so that strength of the sintered aluminum alloy decreased, and wear resistance was degraded. In No. 27, an alumite coating was provided on the sliding surface of ingot metallurgy aluminum alloy, and the coating peeled off during friction sliding, resulting in seizure and sticking with the mating material.

In No. 22, the content of aluminum nitride was larger than the optimal amount, and in Nos. 24 and 25, the contents of oxide particles were larger than the optimal amount, so that wear of tool was considerable as compared with other examples in processing the valve spool, presenting a problem in machinability.

From the evaluation described above, it has been found that the sintered aluminum alloy used for the valve in accordance with the present invention has sufficient wear resistance and seizure resistance for the valve spool, even without surface coating such as the alumite coating. Further, the sintered aluminum alloy valve spool can be used without necessitating coating on the surface of the ingot metallurgy aluminum alloy of the valve case as the mating material, and hence the present invention is superior in view of economy.

TABLE 7

Alloy Composition of Sintered Aluminum Alloy for Valve Spool (wt %/remaining part; Al)

| No. | Si | Fe | Ni | Cr | Ti | Zr | Mn | Mg | Oxide particles | Lubricating particles | AlN(N) |
|---|---|---|---|---|---|---|---|---|---|---|---|
| 1 | 0 | 1 | 2 | 0 | 0 | 0 | 0 | 0.7 | 0 | 0 | 5.6(1.8) |
| 2 | 0 | 1 | 2 | 0 | 0 | 0 | 0 | 0.7 | 0 | 0 | 3.7(1.2) |
| 3 | 0 | 1 | 2 | 0 | 0 | 0 | 0 | 0.7 | 0 | 0 | 1.9(0.6) |
| 4 | 8 | 0 | 0 | 0 | 0 | 0 | 0 | 0.5 | 0 | 0 | 3.1(1.0) |
| 5 | 8 | 0 | 0 | 0 | 0 | 0 | 0 | 0.5 | 0 | 0 | 4.7(1.5) |
| 6 | 12 | 0 | 2 | 0 | 0 | 0 | 0 | 0.1 | 0 | 0 | 2.2(0.7) |
| 7 | 12 | 0 | 0 | 2 | 1 | 0 | 0 | 0.3 | 0 | 0 | 1.6(0.5) |
| 8 | 12 | 0 | 0 | 0 | 0 | 1 | 1 | 0.1 | 0 | 0 | 0.7(0.2) |
| 9 | 12 | 0 | 2 | 0 | 0 | 0 | 0 | 0.1 | A; 1.0 | 0 | 2.2(0.7) |
| 10 | 12 | 0 | 2 | 0 | 0 | 0 | 0 | 0.1 | B; 1.0 | 0 | 2.0(0.6) |
| 11 | 12 | 0 | 2 | 0 | 0 | 0 | 0 | 0.1 | 0 | W; 1.0 | 2.2(0.7) |
| 12 | 12 | 0 | 2 | 0 | 0 | 0 | 0 | 0.1 | 0 | X; 1.0 | 2.2(0.7) |
| 13 | 15 | 0 | 0 | 2 | 0 | 0 | 0 | 0.5 | 0 | Y; 1.0 | 1.3(0.4) |
| 14 | 15 | 0 | 0 | 2 | 0 | 0 | 0 | 0.5 | 0 | Z; 1.5 | 0.7(0.2) |
| 15 | 15 | 0 | 0 | 2 | 0 | 0 | 0 | 0.5 | C; 0.5 | 0 | 1.6(0.5) |
| 16 | 15 | 0 | 0 | 2 | 0 | 0 | 0 | 0.5 | D; 0.5 | 0 | 1.6(0.5) |
| 17 | 15 | 0 | 0 | 2 | 0 | 0 | 0 | 0.5 | E; 0.5 | 0 | 1.6(0.5) |
| 18 | 0 | 2 | 2 | 0 | 0 | 0 | 0 | 1.0 | A; 0.5 | W; 1.0 | 4.9(1.6) |
| 19 | 12 | 0 | 2 | 0 | 0 | 0 | 0 | 0.1 | F; 0.5 | Y; 1.0 | 2.2(0.7) |
| 20 | 12 | 0 | 2 | 0 | 0 | 0 | 0 | 0.1 | 0 | 0 | 0(0) |
| 21 | 20 | 3 | 0 | 0 | 0 | 0 | 0 | 0.1 | 0 | 0 | 0.3(0.1) |
| 22 | 8 | 0 | 0 | 0 | 0 | 0 | 0 | 0.5 | 0 | 0 | 7.3(2.4) |

TABLE 7-continued

Alloy Composition of Sintered Aluminum Alloy for Valve Spool (wt %/remaining part; Al)

| No. | Si | Fe | Ni | Cr | Ti | Zr | Mn | Mg | Oxide particles | Lubricating particles | AlN(N) |
|---|---|---|---|---|---|---|---|---|---|---|---|
| 23 | 25 | 3 | 3 | 0 | 0 | 0 | 0 | 1.0 | 0 | 0 | 2.2(0.7) |
| 24 | 12 | 0 | 2 | 0 | 0 | 0 | 0 | 0.1 | A; 6.0 | 0 | 1.9(0.6) |
| 25 | 12 | 2 | 0 | 0 | 0 | 0 | 0 | 0.6 | B; 6.0 | 0 | 2.2(0.7) |
| 26 | 12 | 0 | 2 | 0 | 0 | 0 | 0 | 0.1 | 0 | W; 6.0 | 2.2(0.7) |

(Examples of the invention; 1~9, Comparative examples; 20~26)
Classification of oxide spherical particles A; Al$_2$O$_3$, B; ZrO$_2$, C; SiO$_2$, D; MgO$_2$, E; TiO$_2$, F; Cr$_2$O$_3$
Classification of solid lubricating particles W; graphite X; MoS$_2$, Y; WS$_2$, Z; CaF

TABLE 8

Wear resistance (amount of wear) and seizure resistance (presence/absence of seizure-sticking)

| No. | Amount of wear-damage Valve spool material | Amount of wear-damage Mating material AC8A | Presence/absence of seizure-sticking on sliding surface |
|---|---|---|---|
| 1 | 3 | 5 | Seizure-sticking not observed on either sliding surface |
| 2 | 5 | 4 | Seizure-sticking not observed on either sliding surface |
| 3 | 3 | 4 | Seizure-sticking not observed on either sliding surface |
| 4 | 3 | 2 | Seizure-sticking not observed on either sliding surface |
| 5 | 4 | 6 | Seizure-sticking not observed on either sliding surface |
| 6 | 4 | 5 | Seizure-sticking not observed on either sliding surface |
| 7 | 3 | 4 | Seizure-sticking not observed on either sliding surface |
| 8 | 6 | 6 | Seizure-sticking not observed on either sliding surface |
| 9 | 4 | 4 | Seizure-sticking not observed on either sliding surface |
| 10 | 3 | 2 | Seizure-sticking not observed on either sliding surface |
| 11 | 2 | 3 | Seizure-sticking not observed on either sliding surface |
| 12 | 4 | 4 | Seizure-sticking not observed on either sliding surface |
| 13 | 5 | 6 | Seizure-sticking not observed on either sliding surface |
| 14 | 3 | 4 | Seizure-sticking not observed on either sliding surface |
| 15 | 5 | 7 | Seizure-sticking not observed on either sliding surface |
| 16 | 3 | 4 | Seizure-sticking not observed on either sliding surface |
| 17 | 6 | 5 | Seizure-sticking not observed on either sliding surface |
| 18 | 3 | 5 | Seizure-sticking not observed on either sliding surface |
| 19 | 4 | 4 | Seizure-sticking not observed on either sliding surface |
| 20 | 17 | 23 | Seizure-sticking not observed on either sliding surface |
| 21 | 12 | 16 | Seizure-sticking not observed on either sliding surface |
| 22 | 3 | 24 | Seizure observed on disk sliding surface |
| 23 | 5 | 17 | Seizure observed on disk sliding surface |
| 24 | 4 | 14 | Seizure observed on disk sliding surface |
| 25 | 6 | 19 | Seizure observed on disk sliding surface |
| 26 | 11 | 22 | Seizure observed on both sliding surfaces |
| 27 | 29 | 46 | Alumite layer peeled, seizure observed on both sliding surfaces |

(Examples of the invention; 1~19, Comparative examples; 20~27)

(Tenth Example)

To an aluminum alloy powder containing 12 wt % of silicon, 2 wt % of iron, 10 wt % of nickel and 1 wt % of magnesium, particles (average grain diameter 5 μm) of titanium oxide was added by 1.5 wt %, and the resulting aluminum alloy powder was compacted. The compacted aluminum alloy powder was heated and kept in a nitrogen atmosphere at 540° C. for 3 to 5 hours, and sintered aluminum alloy containing 4 wt % of aluminum nitride was fabricated. The sintered aluminum alloy was subjected to hot forging, to provide bar shaped valve spools. At this time, porosity of valve spools formed of the sintered aluminum alloy was varied by controlling extrusion condition (extrusion ratio).

Wear resistance and seizure resistance of the sintered aluminum alloy of the resulting valve spools were evaluated. Wear resistance was evaluated by tip on disk thrust test, in ATF dipped state. The sintered aluminum alloy was used on the tip side. Ingot metallurgy aluminum alloy (JIS AC8A material) was used on the disk side, which was the mating material. The test condition was as follows: pressure, 100 kgf/cm$^2$; sliding speed 1 m/s; sliding time, 30 minutes. For comparison, similar evaluation was performed on a chip material having an alumite coating (micro-Vickers hardness MHv=180) provided on the surface of the ingot metallurgy aluminum alloy.

The results are as shown in Table 9 below. As can be seen from Table 9, in Nos. 1 to 5, seizure or abrasive wear with the mating material was not observed in the sintered aluminum alloys having porosities within the prescribed range. It has been found that these sintered aluminum alloys have superior wear resistance, appropriate characteristic against attacking of mating material, and seizure resistance as compared with the ingot metallurgy aluminum alloy provided with aluminum coating. Especially, the sintered aluminum alloy having the porosity within the range of 3 to 10 vol % had excellent characteristics.

The comparative materials suffered from the following problems. In No. 6, porosity was as large as 27 vol %, so that the sintered aluminum alloy did not have sufficient strength, and therefore it was worn and sticking was observed locally on the sliding surface. In No. 7, porosity was as large as 30 vol %, so that strength of the sintered aluminum alloy degraded, resulting in chipping of the sample during friction test. Sticking was observed on the entire sliding surface. Friction coefficient was as large as exceeding 0.1. In No. 8, pressure on the sliding surface was so high that alumite coating on the ingot metallurgy aluminum alloy was partially peeled off, resulting in wear.

TABLE 9

| No. | Porosity (%) | Wear resistance (amount of wear μm) Tip side | Wear resistance (amount of wear μm) Disk side | Seizure (kgf/cm²) (load at which seizure occurs) | Friction coefficient | Remarks |
|---|---|---|---|---|---|---|
| 1 | 1 | 2 | 3 | 450 | 0.021 | good |
| 2 | 6 | 3 | 3 | 470 | 0.014 | good |
| 3 | 10 | 3 | 2 | 480 | 0.010 | good |
| 4 | 18 | 4 | 4 | 455 | 0.018 | good |
| 5 | 23 | 4 | 4 | 445 | 0.020 | good |
| 6 | 27 | 12 | 11 | 375 | 0.062 | partially peeled |
| 7 | 30 | 37 | 24 | Chipping observed on tip during test | 0.128 | Sticking entirely |
| 8 | alumite | 7 | 6 | 445 | 0.028 | Partially peeled |

(Examples of the invention; 1~5, Comparative Example 6~8)

(Eleventh Example)

Figure 9:
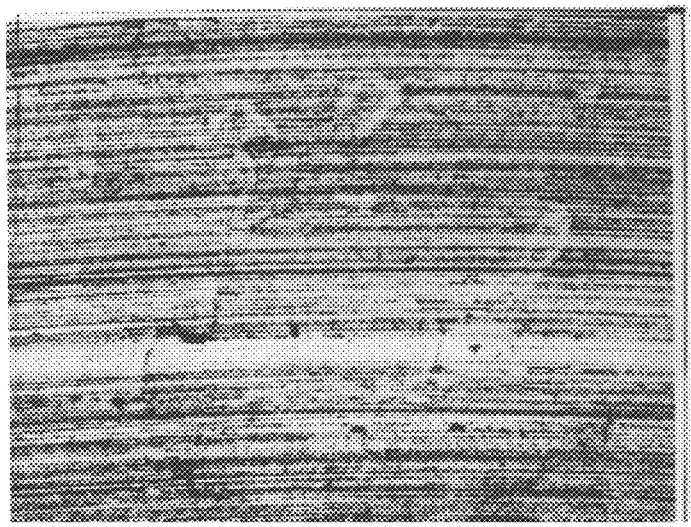
FIG. 9 is an optical microscope photograph of the sliding surface of the mating material after friction test of sintered aluminum alloy formed by direct nitriding reaction.
Figure 10:
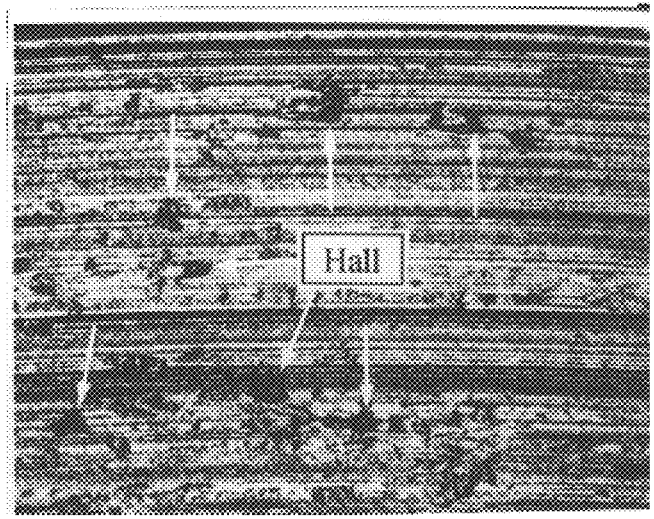
FIG. 10 is an optical microscope photograph of the sliding surface after friction test of sintered aluminum alloy formed by adding aluminum nitride particles.
Figure 11:
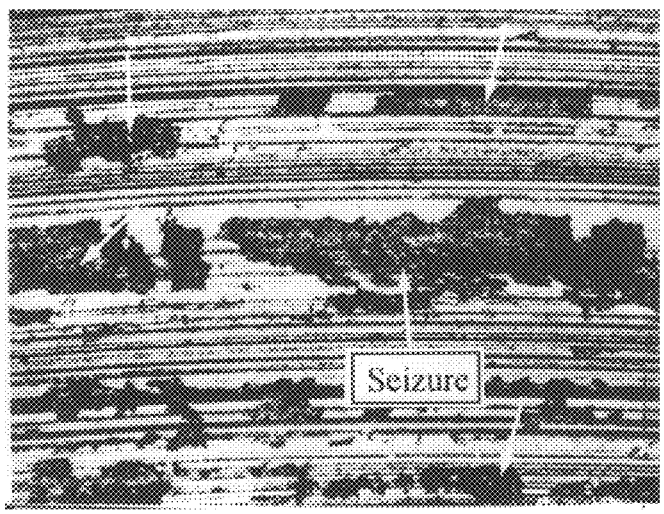
FIG. 11 is an optical microscope photograph of the sliding surface of the mating material after friction test of sintered aluminum alloy formed by adding aluminum nitride particles.
Figure 12:
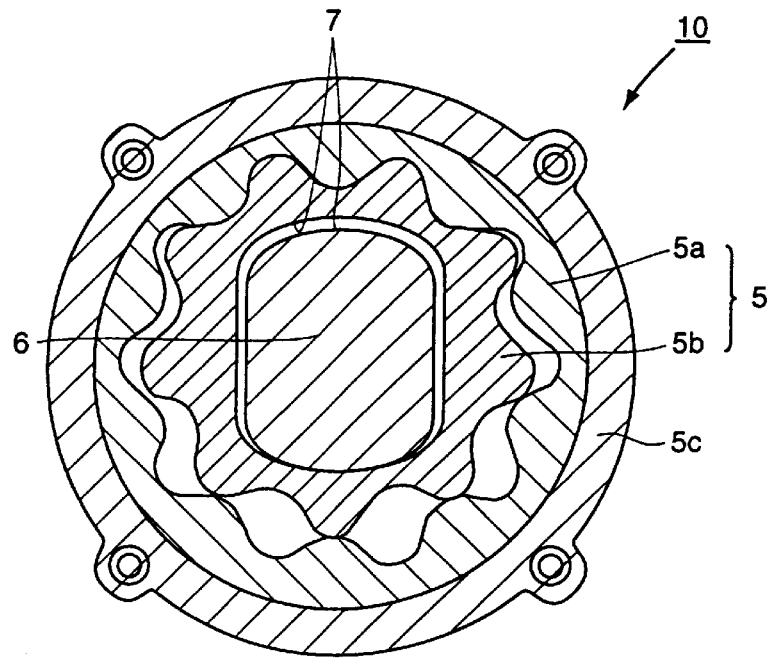
FIG. 12 is a cross section of an oil pump related to the present invention.

Damages on the sintered aluminum alloy and the mating materials after tip on disk thrust test with samples dipped in lubricant oil, using the sintered aluminum alloy fabricated in accordance with the tenth example, was observed by optical microscope. Results are as shown in FIGS. 8 to 11. FIG. 8 shows the state of damage on the sintered aluminum alloys fabricated by direct nitriding method, and FIG. 9 shows state of damages on the mating material. FIG. 10 shows the state of damage on the conventional sintered aluminum alloy, and FIG. 11 shows the state of damage on the mating material thereof. The mating materials were both of ingot metallurgy aluminum alloy (ADC12 material).

Referring to FIG. 8, only a slight trace of abrasion was observed, and there is not any seizure or sticking observed on the sliding surface of the sintered aluminum alloy fabricated by direct nitriding method. There was no trace of aluminum nitride particles fallen out from the sliding surface. Further, referring to FIG. 9, there was no seizure or sticking observed on the sliding surface of the mating material, and there was only a slight trace of abrasion.

By contrast, referring to FIG. 10, there are numerous holes from which aluminum nitride particles fallen off, on the sliding surface of the conventional sintered aluminum alloy, and in addition, deep scratch resulting from sliding was observed. Referring to FIG. 11, there are deep scratches caused by the attack of fallen aluminum nitride particles, as well as seizure, observed on the sliding surface of the mating material.

In the sintered aluminum alloy fabricated by direct nitriding reaction, there is not a gap at the interface between aluminum nitride and the matrix of aluminum alloy, and aluminum nitride is strongly bonded to the matrix. Therefore, even when the aluminum alloy slides with friction over the ingot metallurgy aluminum alloy as the mating material, aluminum nitride particles do not fall out, and hence the sintered aluminum alloy has superior wear resistance, seizure resistance and appropriate characteristic against attacking of the mating material.

(Twelfth Example)

Valve spools (diameter=16 mm, overall length=32 mm) formed by compacting sintered aluminum alloy having various coefficients $\alpha_v$ of thermal expansion, and valve cases formed of ingot metallurgy aluminum alloy prepared by aluminum high pressure casting were prepared. The valve spools were set in the valve cases, and continuous endurance test for 400 hours was performed, with oil lubricant. After the endurance test, the state of damage on the sliding surfaces of the valve spools and the valve cases (wear, damage, seizure, sticking) and oil pressure variation ratio were evaluated.

The results are as shown in Table 10. Here, oil pressure variation ratio represents ratio (%) of maximum variation width with respect to the target value of oil pressure after endurance test. The composition of the aluminum cast alloy used for the valve cases was Al-17% Si-3% Cu-1% Mg (represented in percentage by weight). The coefficient $\alpha c$ of thermal expansion thereof was $19.5 \times 10^{-6}/°$ C. In the table, the values of the coefficient of thermal expansion represent average values from room temperature to 200° C.

Referring to Table 10, in Nos. 1 to 6, that is, in combinations of valve spools and valve cases of which coefficients of thermal expansion satisfy the relation of $-3 \times 10^{-6}/°$ C. $\leq (\alpha c - \alpha v) \leq 3 \times 10^{-6}/°$ C., wear, damage, seizure or sticking was not observed on the sliding surfaces, and the sliding surfaces were good. The value of oil pressure variation ratio was within 5%, which means that the performance of the oil pump was not degraded.

When the coefficients of thermal expansion do not satisfy the relation represented by the expression above, the following problems occur. In No. 7, wear or sticking was not observed on the sliding surfaces of the valve spool and the valve case, while oil pressure variation ratio was as high as 9.2%, as the clearance between the valve spool and the valve case was increased, which means that the performance of the oil pump was significantly degraded. In No. 8, wear or sticking was not observed on the sliding surfaces of the valve spool and the valve case, while oil pressure variation ratio was as large as 10.2% as the clearance between the valve spool and the valve case was increased, and hence performance of the oil pump was degraded significantly. In No. 9, coefficient of thermal expansion of the valve spool was too large, eliminating any clearance with the valve case. Therefore, the valve spool and the valve case were in contact with each other and slid over each other for a long period of time. Accordingly, sticking and wear were observed on both sliding surfaces, and the clearance was increased. As a result, oil pressure variation ratio attained as high as 22.6%, and the performance of the oil pump was degraded significantly.

TABLE 10

| No. | $\alpha v$ [$\times 10^{-6}/°$ C.] | $\alpha c - \alpha v$ [$\times 10^{-6}/°$ C.] | Valve spool sliding surface | Case sliding surface | Oil pressure variation ratio (%) | Alloy composition of valve spool material (wt %) |
|---|---|---|---|---|---|---|
| 1 | 19.3 | 0.2 | good | good | 1.8 | Al-12% Si-2% Fe-1% Mg-2% AlN |
| 2 | 18.8 | 0.7 | good | good | 2.4 | Al-12% Si-2% Ni-1% Mg-3% AlN |

TABLE 10-continued

| No. | $\alpha v$ [×10$^{-6}$/° C.] | $\alpha c-\alpha v$ [×10$^{-6}$/° C.] | Valve spool sliding surface | Case sliding surface | Oil pressure variation ratio (%) | Alloy composition of valve spool material (wt %) |
|---|---|---|---|---|---|---|
| 3 | 18.1 | 1.4 | good | good | 3.3 | Al-16% Si-2% Ni-1% Mg-2% AlN |
| 4 | 17.7 | 1.8 | good | good | 3.9 | Al-16% Si-2% Ni-1% Mg-4% AlN |
| 5 | 17.1 | 2.4 | good | good | 4.6 | Al-17% Si-2% Fe-1% Ni-1% Mg-3% AlN |
| 6 | 21.1 | -1.6 | good | good | 1.1 | Al-8% Si-1% Mg-4% AlN |
| 7 | 15.6 | 3.9 | good | good | 9.2 | Al-20% Si-2% Ni-1% Mg-12% AlN |
| 8 | 15.1 | 4.4 | good | good | 10.2 | Al-22% Si-2% Fe-2% Ni-1% Mg-8% AlN |
| 9 | 22.7 | -3.2 | sticking observed | sticking observed | 22.6 | Al-4% Si-1% Mg |

Examples of the Invention; 1 ~ 6, Comparative Examples; 7 ~ 9)

(Thirteenth Example)

Valve spools (diameter=18 mm, overall length=27 mm) having various coefficients $\alpha_v$ of thermal expansion and valve cases formed of ingot metallurgy aluminum alloy prepared by aluminum low pressure casting were prepared. Valve spools were set in the valve cases, and continuous endurance test for 400 hours was performed with oil lubricant. Thereafter, state of damage (wear, damage, seizure, sticking) of the sliding surfaces of the valve spools and the valves cases as well as oil pressure variation ratio were evaluated. Here, the oil pressure variation ratio represents ratio (%) of maximum variation width with respect to the target value of oil pressure after endurance test. The composition of the aluminum alloy for the valve cases was Al-11% Si-3% Cu-1% Mg (represented in percentage by weight). Coefficient of thermal expansion $\alpha_c$ of aluminum cast alloy was 20.3×10$^{-6}$/° C. The value of the coefficient of thermal expansion is an average value from room temperature to 200° C.

The results are as shown in Table 11 below. In Nos. 1 to 5, that is, where coefficients of thermal expansion satisfy the relation $-3×10^{-6}/° C. \leq (\alpha_c-\alpha_v) \leq 3×10^{-6}/° C.$, wear, damage, seizure or sticking was not observed on the sliding surfaces of the spools and the valve cases, and good sliding surfaces were observed. Further, the oil pressure variation ratio was within 5%, which means that the performance of the oil pump was not degraded.

By contrast, when coefficients of thermal expansion of the valve spools and the valve cases do not satisfy the relation described above, the following problems arise. In No.6, wear or sticking was not observed on the sliding surfaces of the valve spool and the valve case, while oil pressure variation ratio resulting from increase clearance between the valve spool and the valve case was as high as 10.6%, which means that performance of the oil pump was significantly degraded. In No. 7, wear or sticking was not observed on the sliding surfaces of the valve spool and the valve case, while oil pressure variation ratio resulting from increase clearance between the valve spool and the valve case was as high as 10.9%, which means that performance of the oil pump was significantly degraded.

TABLE 11

| No. | $\alpha v$ [×10$^{-6}$/° C.] | $\alpha c-\alpha v$ [×10$^{-6}$/° C.] | Valve spool sliding surface | case sliding surface | Oil pressure variation ratio (%) | Alloy composition of valve spool material (wt %) |
|---|---|---|---|---|---|---|
| 1 | 19.3 | 1.0 | good | good | 2.6 | Al-12% Si-2% Fe-1% Mg-2% AlN |
| 2 | 18.8 | 1.5 | good | good | 3.1 | Al-12% Si-2% Ni-1% Mg-3% AlN |
| 3 | 18.1 | 2.2 | good | good | 4.0 | Al-16% Si-2% Ni-1% Mg-2% AlN |
| 4 | 17.7 | 2.6 | good | good | 4.7 | Al-16% Si-2% Ni-1% Mg-4% AlN |
| 5 | 21.1 | -0.8 | good | good | 1.4 | Al-8% Si-1% Mg-4% AlN |
| 6 | 15.6 | 4.7 | good | good | 10.6 | Al-20% Si-2% Ni-1% Mg-12% AlN |
| 7 | 15.1 | 5.2 | good | good | 11.9 | Al-22% Si-2% Fe-2% Ni-1% Mg-8% AlN |

(Examples of the Invention; 1~5, Comparative Examples; 6~7)

(Fourteenth Example)

An aluminum alloy powder containing 16 wt % of silicon, 4 wt % of nickel and 0.5 wt % of magnesium was compacted. Thereafter, the aluminum alloy powder compact body was heated and held in a nitrogen atmosphere at 550° C. for 4 hours, so as to fabricate sintered aluminum alloy containing 3.5 wt % of aluminum nitride. The sintered aluminum alloy was compacted through hot extrusion, and subjected to machining, so that valve spools having porosity of 3 vol % were fabricated. Ingot metallurgy aluminum alloy (JIS AC8 material) was used for the valve cases. Alumite coatings of various hardnesses were provided on surfaces over which the valve spools slide. The valve spools formed of the sintered aluminum alloy were set in the valve cases.

Iron powder and aluminum powder having grain diameters within the range of 2 to 10 μm were added as foreign particles to a lubricant, by 0.5 wt % with respect to the lubricant. With ATF introduced and circulated within the valve cases, continuous endurance test for 100 hours was conducted. Thereafter, state of damages (wear, damage, seizure, sticking) on the sliding surfaces of the valve spools and the valve cases were evaluated. For comparison, a valve spool formed of an ingot metallurgy aluminum alloy provided with an aluminum coating on the sliding surface was prepared, and similar endurance test was conducted. Hardness of the alumite coating was micro-Vickers hardness MHv=180.

The results are as shown in Table 12 below. As can be seen from Table 12, seizure or abrasive wear was not observed on the sliding surface of the valve case provided with the alumite coating of prescribed hardness.

The following problem was experienced by the comparative material. In No. 4, alumite coating had hardness as low as 130, so that the aluminum coating was abraded, resulting in sticking on the valve case side. In No. 5, sliding surface of the valve case was not provided with any alumite coating, and therefore sticking was observed on the valve case side. In No. 6, the alumite coating on the valve spool side was peeled off, and hence sticking was observed both on the valve spool and the valve case.

Even when there was abrasive wear on the valve case, the problem of seizure or sticking was not experienced if the valve spool formed of the sintered aluminum alloy in accordance with the present invention was used. More specifically, it has been found that even when foreign particles should be introduced between the valve spool and the valve case, the sintered aluminum alloy in accordance with the present invention ensures superior durability and wear resistance.

TABLE 12

| No. | Hardness (MHv) | State of wear and damage on sliding surface | |
|---|---|---|---|
| | | Valve spool side | Case side |
| 1 | 160 | Good | Good |
| 2 | 190 | Good | Good |
| 3 | 235 | Good | Good |
| 4 | 130 | Good | Sticking observed |
| 5 | None | Good | Sticking observed |
| 6 | 190 | Peeling Wear | Sticking observed |

(Examples of the invention; 1~3, Comparative Examples; 4~6)

In the following, embodiments of the oil pump in accordance with the present invention will be described.

(Fifteenth Example)

Using a sintered aluminum alloy having the composition of Al-16% Si-2% Ni-1% Mg-2% AlN by weight, an outer gear rotor (outer diameter=φ90 mm, thickness=10 mm) having 10 teeth and an inner gear rotor (thickness=10 mm) were fabricated, and a gear rotor set including the combination of these was set in a pump case formed of ADC12 aluminum alloy, thus providing an oil pump. Here, the outer and inner rotors have teeth of which shape is a curve based on trochoid curve.

A driving shaft having oval cross section and two parallel surfaces was inserted to the inner diameter surface of the inner rotor, and ATF (oil temperature, 150° C.) was circulated in the pump case. In this state, endurance test of 600 rpm×17 kgf/cm²×20 hr was conducted. At this time, members formed of inorganic materials having various micro-Vickers hardnesses as shown in Table 13 below were press fit at the two parallel portions between inner rotor 5b and rotary driving shaft 6. The press fit member had its shape and dimension adjusted by machining, so that it was fit with the oval rotary driving shaft. For comparison, evaluation was performed under the same condition without press fitting the members of inorganic materials. The results of endurance test are as shown in Table 13.

TABLE 13

| | Press Fit Member | | Wear and Damage on | Vibration/ |
|---|---|---|---|---|
| No. | Material | Hardness (MHv) | Press Fit Member Surface Contacting Driving Shaft | Noise During Endurance Test |
| 1 | Iron based sintered body | 460 | No wear/damage observed | No vibration/ noise observed |
| 2 | Al based material | 298 | No wear/damage observed | No vibration/ noise observed |
| 3 | Cu—Ni based material | 275 | No wear/damage observed | No vibration/ noise observed |
| 4 | Ti—Al based material | 582 | No wear/damage observed | No vibration/ noise observed |
| 5 | Ni—Al based material | 462 | No wear/damage observed | No vibration/ noise observed |
| 6 | Iron based ingot metallurgy material | 736 | No wear/damage observed | No vibration/ noise observed |
| 7 | Ti based ingot metallurgy material | 494 | No wear/damage observed | No vibration/ noise observed |
| 8 | Ni based ingot metallurgy material | 446 | No wear/damage observed | No vibration/ noise observed |
| 9 | Aluminum nitride | 980 | No wear/damage observed | No vibration/ noise observed |
| 10 | Silicon nitride | 1150 | No wear/damage observed | No vibration/ noise observed |
| 11 | Aluminum oxide | 1012 | No wear/damage observed | No vibration/ noise observed |
| 12 | Silicon nitride | 1750 | No wear/damage observed | No vibration/ noise observed |
| 13 | Boron nitride | 845 | No wear/damage observed | No vibration/ noise observed |
| 14 | Iron based sintered material | 227 | Wear·Laminer Peeling Observed | Vibration·Noise Observed |
| 15 | Al based sintered material | 175 | Wear·Laminer Peeling Observed | Vibration·Noise Observed |
| 16 | Bronze based ingot metallurgy material | 86 | Wear·Laminer Peeling Observed | Vibration·Noise Observed |
| 17 | No press fit member | — | Wear·Laminer Peeling Observed | Vibration·Noise Observed |

(Examples of the Invention Nos. 1~13, Comparative Examples; Nos. 14~17)

In Nos. 1 to 13 in accordance with the present invention, the press fit members were formed of metal based or ceramic based material having micro-Vickers hardness of at least 250, and therefore wear or damage of members was not observed after endurance test. No vibration or noise was observed during operation, and it was recognized that superior pump performance was ensured. The metal press fit members could be fabricated either by sintering or ingot metallurgy.

In Nos. 14 to 17 as comparative examples, press fit members had micro-Vickers hardness of smaller than 250. Therefore, wear and damage or laminer peeling was observed on the surface of the press fit member which was in contact with the driving shaft, after endurance test. Further, noise and vibration occurred during operation, and therefore use as an oil pump was not possible.

(Sixteenth Example)

Using sintered aluminum alloy having the composition of Al-15% Si-3% Fe-0.5% Mg-3% AlN by weight, an outer gear rotor (outer diameter=φ86 mm, thickness=10 mm)

having 10 teeth and an inner gar rotor (thickness=10 mm) having 9 teeth were fabricated. Gear rotor sets each having the combination of the outer and inner gear rotors were set in pump cases formed of ADC12 aluminum alloy, whereby oil pumps were provided. Here, the shapes of the teeth of outer and inner rotors were curves based on involute curve.

Figure 13:
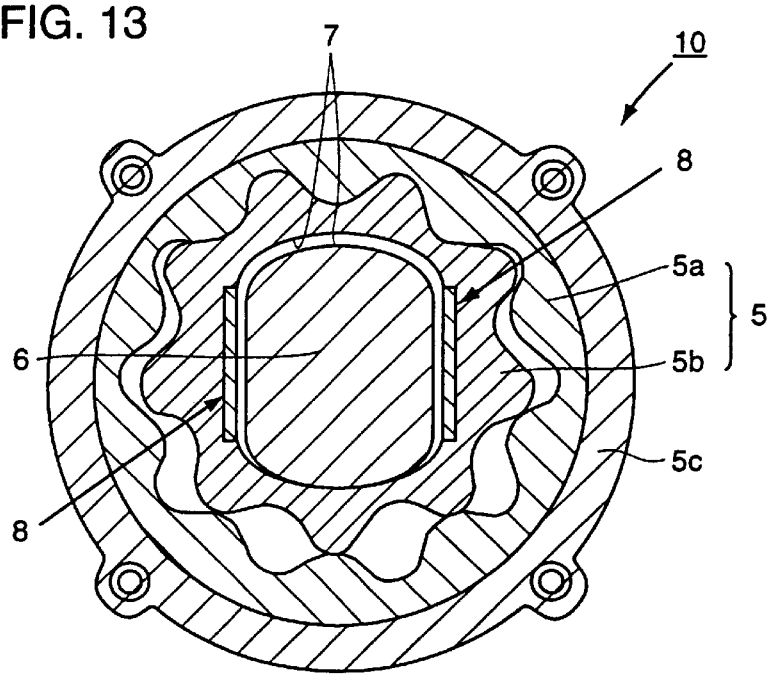
FIG. 13 is a cross section showing a press fit member provided in the oil pump.

A driving shaft having oval cross section and two parallel surfaces was inserted to the inner diameter surface of each inner rotor, and endurance test of 7000 rpm×15 kgf /cm²×30 hr was conducted with ATF of which oil temperature varied variously being circulated within the pump cases. This time, various organic materials as shown in Table 14 were attached by adhesive on the inner diameter side of inner rotor 5b as shown in FIG. 13, as the press fit member, and the press fit member was adapted to have such dimension-shape that fits the oval rotary driving shaft. For comparison, samples not having the organic material members press fitted were provided and evaluated under the same condition. The results of endurance test are as shown in Table 14 below.

TABLE 14

| No. | Material of Press Fit Member | ATF Temperature (° C.) | Wear and Damage on Press Fit Member Surface Contacting Driving Shaft | Vibration/ noise during endurance test |
|---|---|---|---|---|
| 18 | Phenol based resin | 150 | No wear/damage observed | No vibration / noise observed |
| 19 | Acrylic resin | 150 | No wear/damage observed | No vibration / noise observed |
| 20 | Polyimide | 220 | No wear/damage observed | No vibration / noise observed |
| 21 | Polyamide | 230 | No wear/damage observed | No vibration / noise observed |
| 22 | Polyamide imide | 230 | No wear/damage observed | No vibration / noise observed |
| 23 | Phenol based resin with alumina particles dispersed | 160 | No wear/damage observed | No vibration / noise observed |
| 24 | Polyamide with iron powder dispersed | 200 | No wear/damage observed | No vibration / noise observed |
| 25 | Phenol based resin | 230 | Wear damage observed | Vibration observed |
| 26 | Acrylic resin | 240 | Wear damage observed | Vibration observed |

Referring to Table 14, when press fit members formed of resin were used, members were not worn or damaged after endurance test. No vibration or noise was observed during operation, and it was recognized that superior pump performance was ensured. However, in the case of phenol based resin and acrylic resin, wear and damage occurred as the oil temperature exceeded softening temperature of resin, resulting in vibration during operation. When there is not the inorganic member press fitted, vibration occurred during operation.

(Seventeenth Example)

Using a sintered aluminum alloy having the composition of Al-12% Si-2% Fe-1% Zr-0.5% Mg-3% AlN by weight, an outer gear rotor (outer diameter=φ86 mm, thickness=9 mm) having 10 teeth, and an inner gar rotor (thickness=9 mm) having 9 teeth were fabricated. Gear rotor sets each having the combination of the outer and inner gear rotors were set in pump cases formed of AC4C aluminum alloy, and thus oil pumps were provided. Here, the shape of teeth of the outer and inner rotors had a curve based on hypo-cycloid curve.

A driving shaft having oval cross section and two parallel surfaces was inserted to the inner diameter surface of each inner rotor, and endurance test of 5000 rpm×20 kgf/cm²×15 hr was conducted, with ATF (oil temperature, 160° C.) circulated in the pump cases. Here, hard coatings having various micro-Vickers harnesses as shown in Table 15 were provided on inner diameter surfaces of the inner rotors each having such dimension-shape that fits the oval rotary driving shaft. For comparison, examples without any coating were provided, and evaluated under the same condition. The results of endurance test are as shown in Table 15.

TABLE 15

| | Hard Coating | | Wear and Damage on Press Fit Surface Contacting Driving Shaft | Vibration/noise during endurance test |
|---|---|---|---|---|
| No. | Material | Hardness (MHv) | | |
| 27 | Ni—P planting | 285 | No wear/damage observed | No vibration/ noise observed |
| 28 | Hard alumite | 276 | No wear/damage observed | No vibration/ noise observed |
| 29 | TiN coating | 785 | No wear/damage observed | No vibration/ noise observed |
| 30 | TiCr coating | 695 | No wear/damage observed | No vibration/ noise observed |
| 31 | Tuframe process | 155 | Wear and damage observed on inner surface of inner rotor caused by wear and peeling | Vibration noise observed |
| 32 | Anodizing plating | 175 | Wear and damage observed on inner surface of inner rotor caused by wear and peeling | Vibration noise observed |

(Examples of the Invention Nos. 27~30, Comparative Examples Nos. 31~32)

In Nos. 27 to 30 in accordance with the present invention, hard coatings all had micro-Vickers hardness of at least 250. Therefore, no wear or damage was observed on the members after endurance test. No vibration or noise was observed either during operation, and it was recognized that superior pump performance was ensured.

In Nos. 31 and 32 as comparative examples, coatings had micro-Vickers hardness smaller than 250. Therefore, after endurance test, coatings which were in contact with the driving shaft were worn or peeled off. As a result, inner diameter surfaces of the inner rotors were damaged. Further, vibration and noise occurred during operation, and hence use as an oil pump was impossible.

(Eighteenth Example)

Figure 14A:
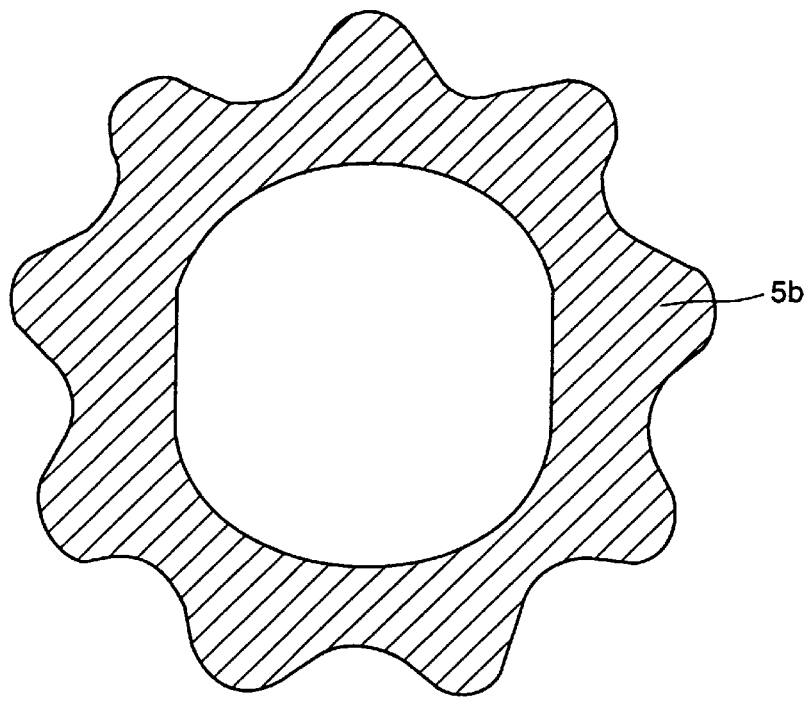
Figure 14B:
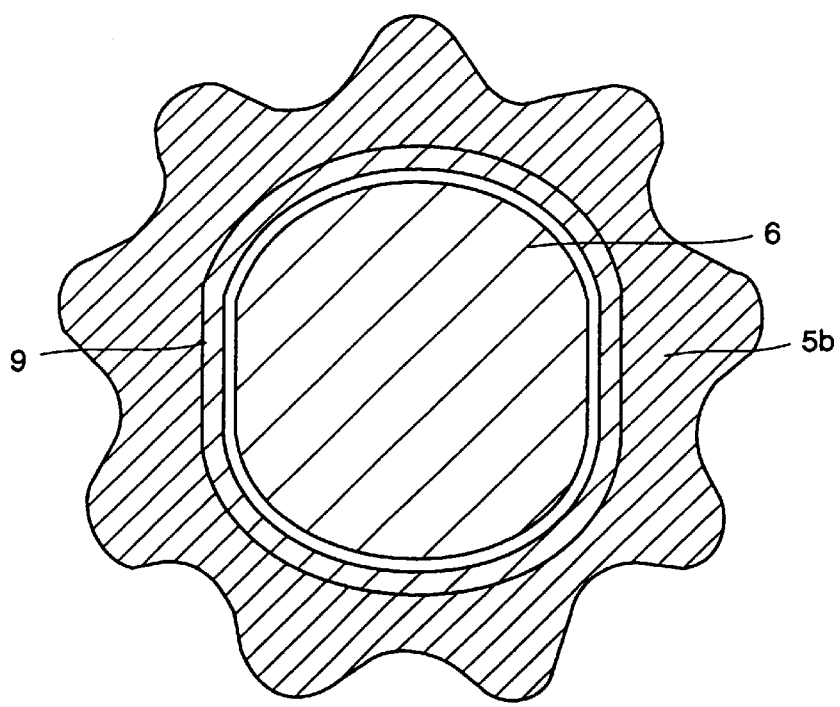

Using a sintered aluminum alloy having the composition of Al-15% Si-3% Fe-0.5% Mg-3% AlN by weight, an outer gear rotor (outer diameter=φ91 mm, thickness=9.5 mm) having 10 teeth and an inner gear rotor (thickness=9.5 mm) having 9 teeth were fabricated. Gear rotor sets each including the combination of the outer and inner gear rotors were set in pump cases formed of ADC12 aluminum alloy, and thus oil pumps were provided. The shape of teeth of the outer and inner rotors was a curve based on involute curve. A driving shaft having oval cross section and two parallel surfaces was inserted to the inner diameter surface of each inner rotor, and endurance test of 6000 rpm×18 kgf/cm²×20 hr was conducted with ATF having various oil temperatures circulated in the pump cases. Various organic material members as inner diameter reinforcing press fit members as shown in Table 16 were press fit and attached by adhesive as reinforcing members on inner diameter surfaces of the inner rotors, as shown in FIG. 14B. The organic material members 9 were adapted to have such dimension-shape that fits the oval rotary driving shaft. For comparison, samples without such organic material members press fitted were prepared and evaluated under the same condition, as shown in FIG. 14A. The results of endurance test are as shown in Table 16.

TABLE 16

| No. | Material of Press Fit Member | ATF Temperature (° C.) | Wear and Damage on Press Fit Member Surface Contacting Driving Shaft | Vibration/ Noise During Endurance Test |
|---|---|---|---|---|
| 33 | Phenol based resin | 160 | No wear/damage observed | No vibration/ noise observed |
| 34 | Acrylic resin | 165 | No wear/damage observed | No vibration/ noise observed |
| 35 | Polyimide | 200 | No wear/damage observed | No vibration/ noise observed |
| 36 | Polyamide | 225 | No wear/damage observed | No vibration/ noise observed |
| 37 | Polyamide imide | 220 | No wear/damage observed | No vibration/ noise observed |
| 38 | Phenol based resin with alumina particles dispersed | 180 | No wear/damage observed | No vibration noise observed |
| 39 | Polyamide with iron powder dispersed | 190 | No wear/damage observed | No vibration/ noise observed |
| 40 | Phenol based resin | 250 | Wear damage | Vibration observed |
| 41 | Acrylic resin | 255 | Wear damage | Vibration observed |

Referring to Table 16, as resin organic materials were used, no wear or damage was observed on the members after endurance test. Further, no vibration or noise was observed during operation, either, and it was recognized that superior pump performance was ensured. In case of phenol based resin and acrylic resin, oil temperature exceeded the resin softening temperature when the oil temperature was set at about 250° C., and therefore wear and damage occurred, resulting in vibration during operation. Vibration was also observed during the test in the example shown in FIG. 14A.

As described above, by the sliding member in accordance with an aspect of the present invention, a gear rotor set and a valve having superior wear resistance, heat resistance, seizure resistance and machinability can be obtained. It has been found that for the gear rotor set, the sintered aluminum alloy is applicable not only to the outer rotor but also to the inner rotor, utilizing high stiffness and high hardness. When appropriate pores are provided, outer and inner rotors having superior seizure resistance and facilitating plastic working such as sizing and coining can be obtained.

When applied to the valve, variation in clearance between the valve spool and the valve case can be decreased, and hence decrease in oil pressure or variation in oil flow rate can be suppressed.

Further, in the oil pump in accordance with another aspect of the present invention, a member or a hard coating is provided between a rotary driving shaft and an inner diameter surface of an inner rotor of an inscribed gear type gear rotor set formed of aluminum alloy used for oil pumps for engine lubrication, automatic transmission or fuel supply, and therefore shock from the driving shaft is not directly received by the inner diameter surface of the inner rotor. Therefore, wear and damage on the inner diameter surface of the inner rotor can be suppressed. As a result, an oil pump entirely formed of aluminum alloy can be provided with high cost efficiency.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pair of sliding members sliding over each other, wherein one of the sliding members is formed of an aluminum alloy containing 5 wt % to 30 wt % of silicon, the other one of the sliding members is formed of a sintered aluminum alloy containing 0.1 wt % to 3.5 wt % of nitrogen, and said nitrogen exist in said sintered aluminum alloy as aluminum nitride.

2. The sliding members according to claim 1, wherein said aluminum alloy forming said one of the sliding members is a sintered aluminum alloy.

3. The sliding members according to claim 1, wherein said aluminum alloy forming said one of the sliding members is an ingot metallurgy aluminum alloy containing 5 wt % to 20 wt % of silicon.

4. The sliding members according to claim 1, wherein said sintered aluminum alloy forming said the other one of the sliding members contain 0.5 wt % to 11 wt % of aluminum nitride.

5. The sliding members according to claim 1, wherein said sintered aluminum alloy forming said the other one of the sliding members contain at least 0.05 wt % of magnesium.

6. The sliding members according to claim 1, wherein said aluminum nitride grows in one direction in fiber structure.

7. The sliding members according to claim 1, wherein porosity of said sintered aluminum alloy forming said the other one of the sliding members is at most 25 vol %.

8. The sliding members according to claim 1, wherein said sintered aluminum alloy forming said the other one of the sliding members contain at least one element selected from the group consisting of silicon, iron, nickel, chromium, titanium, manganese and zirconium, by a content of at most 25 wt %.

9. The sliding members according to claim 1, wherein said sintered aluminum alloy forming said the other one of the sliding members contains at least one oxide selected from the group consisting of titanium oxide, zirconium oxide, silicon oxide, magnesium oxide, aluminum oxide and chromium oxide, by a content of at most 5 wt %.

10. The sliding members according to claim 1, wherein said sintered aluminum alloy forming said the other one of the sliding members contain at least one lubricating component selected from the group consisting of graphite, molybdenum sulfide, tungsten sulfide and calcium fluoride as lubricating component, by a content of at most 5 wt %.

11. The sliding members according to claim 2, wherein said one of the sliding members formed of sintered aluminum alloy is an outer rotor having on its inner peripheral portion teeth of which shape is based on one curve selected from the group consisting of trochoid curve, involute curve and hypo-cycloid curve, the other one of the sliding members formed of said sintered aluminum alloy is an inner rotor having on its outer surface teeth of which shape is based on a curve selected from the group consisting of trochoid curve, involute curve and hypo-cycloid curve, arranged in said outer rotor, and said shape of teeth of said outer rotor matches the shape of teeth of said inner rotor.

12. The sliding members according to claim 11, wherein porosity of said outer rotor is 3 vol % to 15 vol %, and porosity of said inner rotor is 2 vol % to 10 vol %.

13. The sliding members according to claim 3, wherein one of the sliding members formed of said ingot metallurgy aluminum alloy is a valve case, and the other one of the sliding members formed of said sintered aluminum alloy is a valve spool reciprocating and sliding in said valve case.

14. The sliding members according to claim 13, wherein said sintered aluminum alloy contains 0.5 wt % to 6 wt % of aluminum nitride.

15. The sliding members according to claim 14, wherein the following relation is satisfied, where $\alpha_v$ represents coefficient of thermal expansion of said sintered aluminum alloy, and $\alpha c$ represents coefficient of thermal expansion of said ingot metallurgy aluminum alloy:

$$-3\times10^{-6}/°C. \leq (\alpha_c - \alpha_v) \leq 3\times10^{-6}/°C.$$

16. The sliding members according to claim 15, wherein a sliding surface of said valve case is provided with a hard coating having micro-Vickers hardness of at least 150.

17. An oil pump, comprising:

a pump case;

an outer rotor having on its inner peripheral surface teeth of which shape is based on any of trochoid curve, involute curve and hypo-cycloid curve, fixed in said pump case;

an inner rotor to be engaged with the inner peripheral surface of said outer rotor, the inner rotor having on its outer peripheral surface teeth of which shape is based on any of trochoid curve, involute curve and hypo-cycloid curve and having a through hole at the center;

a rotary driving shaft formed of steel inserted to said through hole;

wherein said outer rotor is formed of an aluminum alloy containing 5 wt % to 30 wt % of silicon, said inner rotor is formed of a sintered aluminum alloy containing 0.1 wt % to 3.5 wt % of nitrogen, said nitrogen existing in said sintered aluminum alloy as aluminum nitride, and a wear resistant member is inserted at a fitting surface between said inner rotor and said rotary driving shaft formed of steel.

18. The oil pump according to claim 17, wherein said wear resistant member is a plate member press fitted to said fitting surface.

19. The oil pump according to claim 18, wherein material of said plate member is selected from the group consisting of iron based alloy, copper based alloy, aluminum based alloy, titanium based alloy, nickel based alloy, organic material, oxide, nitride, carbide and boride.

20. The oil pump according to claim 19, wherein said organic material is a resin material.

21. The oil pump according to claim 20, wherein said resin material is selected from the group consisting of thermosetting resin, polyimide, polyamide and polyamide-imide.

22. The oil pump according to claim 17, wherein said wear resistant member is a hard coating formed on an inner surface of said through hole.

23. The oil pump according to claim 22, wherein material of said hard coating is selected from the group consisting of Ni, hard alumite, TiN, TiCr and TiAl.

24. The oil pump according to claim 17, wherein said wear resistant member has micro-Vickers hardness of at least 250.

25. The oil pump according to claim 17, wherein said pump case is formed of a cast aluminum alloy, and said outer rotor is formed of a sintered aluminum alloy.

\* \* \* \* \*